(12) United States Patent
Papanikolopoulos et al.

(10) Patent No.: US 11,188,752 B2
(45) Date of Patent: *Nov. 30, 2021

(54) CROP BIOMETRICS DETECTION

(71) Applicant: Regents of the University of Minnesota, Minneapolis, MN (US)

(72) Inventors: Nikolaos Papanikolopoulos, Minneapolis, MN (US); Vassilios Morellas, Plymouth, MN (US); Dimitris Zermas, Minnetonka, MN (US); David Mulla, Brooklyn Center, MN (US); Mike Bazakos, Bloomington, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/296,856

(22) Filed: Mar. 8, 2019

(65) Prior Publication Data

US 2019/0274257 A1    Sep. 12, 2019

Related U.S. Application Data

(60) Provisional application No. 62/640,447, filed on Mar. 8, 2018, provisional application No. 62/640,455, filed on Mar. 8, 2018.

(51) Int. Cl.
*G06K 9/00* (2006.01)
*G06T 17/00* (2006.01)
(Continued)

(52) U.S. Cl.
CPC .......... *G06K 9/00657* (2013.01); *A01G 2/00* (2018.02); *B64C 39/024* (2013.01); *B64D 47/08* (2013.01);
(Continued)

(58) Field of Classification Search
CPC ...... G06K 9/00657; A01G 2/00; G06Q 50/02; B64D 47/08; B64C 39/024; B64C 2201/127
See application file for complete search history.

(56) References Cited

U.S. PATENT DOCUMENTS 5,253,302 A * 10/1993 Massen ................. G06T 7/0006
                                                                 382/110
10,008,035 B1 * 6/2018 Redden ..................... G06T 7/74
(Continued)

OTHER PUBLICATIONS

Office Action from U.S. Appl. No. 16/296,941, dated Jun. 22, 2020, 7 pp.

(Continued)

*Primary Examiner* — Solomon G Bezuayehu
(74) *Attorney, Agent, or Firm* — Shumaker & Sieffert, P.A.

(57) ABSTRACT

Systems, techniques, and devices for detecting plant biometrics, for example, plants in a crop field. An imaging device of an unmanned vehicle may be used to generate a plurality of images of the plants, and the plurality of images may be used to generate a 3D model of the plants. The 3D model may define locations and orientations of leaves and stems of plants. The 3D model may be used to determine at least one biometric parameter of at least one plant in the crop. Such detection of plant biometrics may facilitate the automation of crop monitoring and treatment.

20 Claims, 28 Drawing Sheets

(51) Int. Cl.
*G06T 7/00* (2017.01)
*B64D 47/08* (2006.01)
*B64C 39/02* (2006.01)
*A01G 2/00* (2018.01)
*G06Q 50/02* (2012.01)
*A01G 7/00* (2006.01)

(52) U.S. Cl.
CPC .......... *G06Q 50/02* (2013.01); *G06T 7/0012* (2013.01); *G06T 17/00* (2013.01); *A01G 7/00* (2013.01); *B64C 2201/127* (2013.01); *G06K 9/00885* (2013.01); *G06T 2200/04* (2013.01); *G06T 2207/10028* (2013.01); *G06T 2207/10032* (2013.01); *G06T 2207/30188* (2013.01)

(56) References Cited

U.S. PATENT DOCUMENTS

| | | | |
|---|---|---|---|
| 2002/0169735 A1 | 11/2002 | Kil et al. | |
| 2005/0243323 A1* | 11/2005 | Hsu | G06T 5/002 356/450 |
| 2008/0231633 A1* | 9/2008 | Keller | G06T 15/06 345/426 |
| 2008/0304710 A1 | 12/2008 | Xu et al. | |
| 2009/0103773 A1* | 4/2009 | Wheeler | G01S 7/4802 382/100 |
| 2009/0210205 A1 | 8/2009 | Sullivan et al. | |
| 2011/0141227 A1* | 6/2011 | Bigioi | G06T 7/593 348/36 |
| 2013/0169478 A1 | 7/2013 | Vourc'h | |
| 2013/0287369 A1 | 10/2013 | Geyzel | |
| 2015/0015697 A1* | 1/2015 | Redden | G01B 11/24 348/89 |
| 2015/0379350 A1* | 12/2015 | Li | G06T 7/174 382/110 |
| 2017/0154463 A1* | 6/2017 | von Cramon | G06T 15/04 |
| 2017/0206415 A1* | 7/2017 | Redden | G06T 7/593 |
| 2017/0372137 A1* | 12/2017 | Kumar | G06T 17/05 |
| 2018/0051295 A1* | 2/2018 | Allen | C12N 15/8261 |
| 2018/0143172 A1* | 5/2018 | McPeek | G01B 5/0035 |
| 2018/0184073 A1 | 6/2018 | Burgess | |
| 2018/0259496 A1 | 9/2018 | McPeek | |
| 2018/0313760 A1* | 11/2018 | Kramer | G01N 21/6486 |
| 2018/0332480 A1 | 11/2018 | Pang et al. | |
| 2019/0029201 A1* | 1/2019 | Griffin | A01G 7/045 |
| 2019/0108639 A1 | 4/2019 | Tchapmi et al. | |
| 2019/0128864 A1* | 5/2019 | Pickett | G01N 33/24 |
| 2019/0221033 A1* | 7/2019 | Messerlie | G06T 7/62 |
| 2019/0274257 A1* | 9/2019 | Papanikolopoulos | G06T 7/0012 |
| 2019/0278988 A1 | 9/2019 | Papanikolopoulos et al. | |
| 2020/0066034 A1 | 2/2020 | Tham et al. | |

OTHER PUBLICATIONS

Zermas et al., "Extracting Phenotypic Characteristics of Corn Crops Through the Use of Reconstructed 3D Models," 2018 IEEE/RSJ International Conference on Intelligent Robots and Systems (IROS), Oct. 2018, 8 pp.

Zermas, "Combining Machine Learning with Computer Vision for Precision Agriculture Applications," Doctor of Philosophy Thesis for University of Minnesota, Apr. 2018, 106 pp.

Final Office Action from U.S. Appl. No. 16/296,941, dated Dec. 10, 2020, 10 pp.

Response to Office Action dated Jun. 22, 2020, from U.S. Appl. No. 16/296,941, filed Nov. 23, 2020, 9 pp.

Advisory Action from U.S. Appl. No. 16/296,941, dated Mar. 2, 2021, 3 pp.

Response to Final Office Action dated Dec. 10, 2020 and Advisory Action dated Mar. 2, 2021, from U.S. Appl. No. 16/296,941, filed Apr. 12, 2021, 10 pp.

Response to the Final Office Action dated Dec. 10, 2020, from U.S. Appl. No. 16/296,941, filed Feb. 10, 2021, 12 pp.

Office Action from U.S. Appl. No. 16/296,941, dated Jun. 3, 2021, 13 pp.

Response to Office Action dated Jun. 3, 2021, from U.S. Appl. No. 16/296,941, filed Oct. 4, 2021, 11 pp.

\* cited by examiner

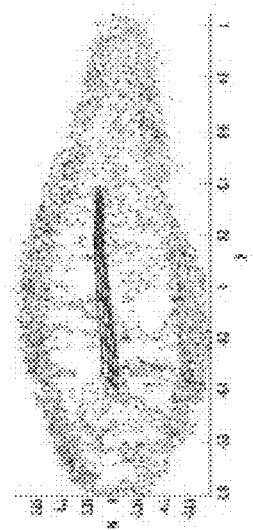
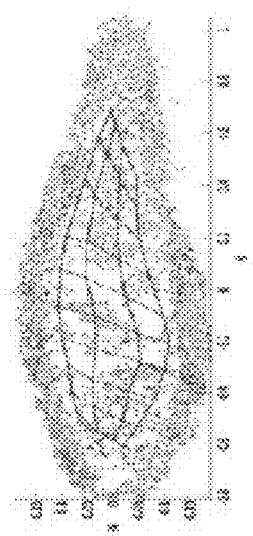
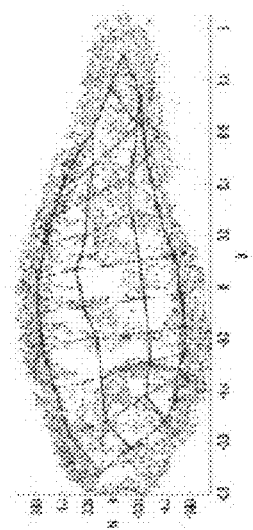
(a) $t = 200$
FIG. 22A
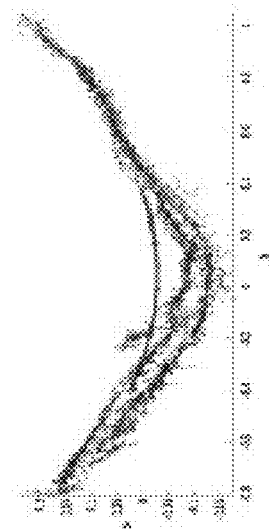
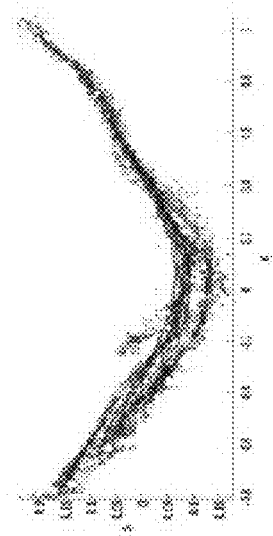
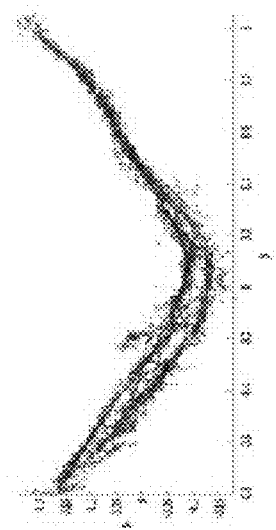
(b) $t = 1000$
FIG. 22B
(c) $t = 6000$
FIG. 22C

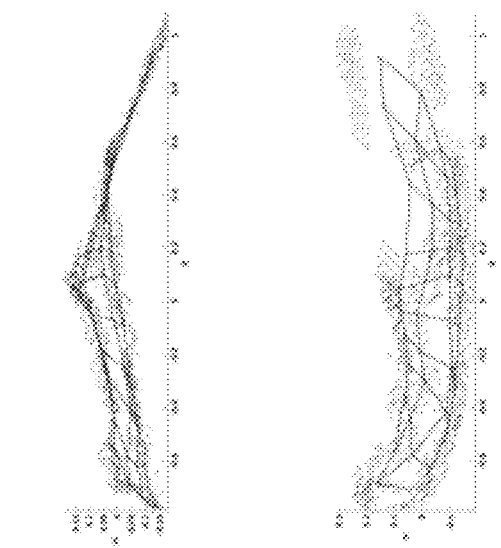
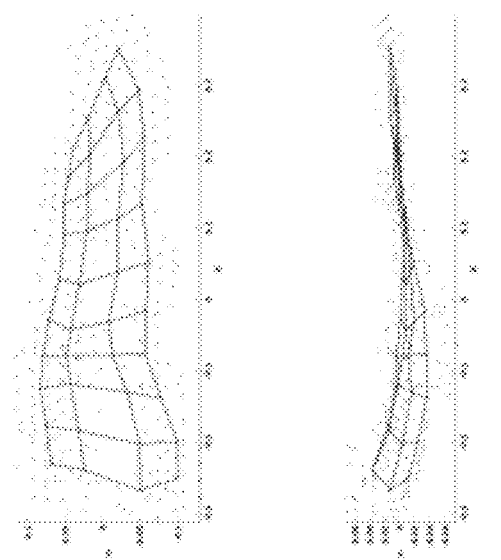
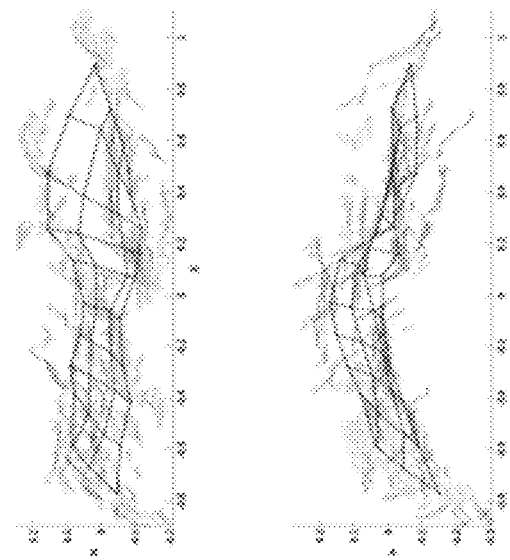
FIG. 25A
FIG. 25B
FIG. 25C

CROP BIOMETRICS DETECTION

This application claims the benefit of U.S. Provisional Patent Application Nos. 62/640,447, filed Mar. 8, 2018 and 62/640,455, filed Mar. 8, 2018, the entire content of each being incorporated herein by reference.

GOVERNMENT RIGHTS

This invention was made with government support under CNS-1439728, U.S. Pat. No. 1,427,014, and CNS-1531330 awarded by National Science Foundation. The government has certain rights in the invention.

TECHNICAL FIELD

This disclosure relates to systems and techniques for detecting crop biometrics.

BACKGROUND

Crops such as corn are produced on significantly large scales. Deficiencies during the cultivation process may impact the ultimate quality of crops. Early detection and treatment of crop deficiencies and periodic evaluation of the status of growth may assist with managing crop quality. For example, plant biometrics information may be useful in assessing plant health and crop status. Invasive techniques for estimating plant biometrics may require the destruction of plants being analyzed. Noninvasive techniques may rely on sparse or random physical measurements that may be manually intensive and not be sufficiently fine-grained or accurate.

SUMMARY

The disclosure describes systems, techniques, and devices for detecting crop biometrics. For examples, a system for detecting crop biometrics, the system comprising an unmanned vehicle comprising at least one imaging device; and a crop modeling device communicatively coupled to the imaging device. The crop modeling device may comprise a processor configured to receive, from the imaging device, a plurality of images of a crop of plants in a field, generate, based on the plurality of images, a three-dimensional (3D) model of the plants, wherein the 3D model defines locations and orientations of leaves and stems of respective plants, and determine, based on the 3D model, at least one of a plant height, a leaf count, a leaf angle, or an inter-nodal distance of a respective plant.

In some examples, an example system for detecting crop biometrics includes an unmanned vehicle including at least one imaging device. The system includes a crop modeling device communicatively coupled to the imaging device. The crop modeling device includes a processor configured to receive, from the imaging device, a plurality of images of a crop of plants in a field. The processor is configured to generate, based on the plurality of images, a three-dimensional (3D) model of the plants. The 3D model defines locations and orientations of leaves and stems of the plants. The processor is configured to segment the 3D model to locate a respective stem and a respective uppermost leaf of each respective plant. The processor is configured to determine, based on the separation between the base of the respective stem and the respective uppermost leaves, a respective plant height of the respective plant.

In some examples, an example technique for detecting crop biometrics includes receiving, by a processor, from an imaging device of an unmanned vehicle, a plurality of images of a crop of plants in a field. The technique includes generating, by the processor, based on the plurality of images, a three-dimensional (3D) model of the plants. The 3D model defines locations and orientations of leaves and stems of the plants. The technique includes segmenting, by the processor, the 3D model to locate a respective stem and a respective uppermost leaf of each respective plant. The technique includes determining, by the processor, based on the separation between the base of the respective stem and the respective uppermost leaves, a respective plant height of each respective plant.

In some examples, an example crop modeling device includes a processor and a non-transitory computer readable storage medium. The storage medium includes instructions, that when executed, cause the processor to receive, from an imaging device of an unmanned vehicle, a plurality of images of a crop of plants in a field. The instructions, when executed, cause the processor to generate, based on the plurality of images, a three-dimensional (3D) model of the plants. The 3D model defines locations and orientations of leaves and stems of the plants. The instructions, when executed, cause the processor to segment the 3D model to locate a respective stem and a respective uppermost leaf of each respective plant. The instructions, when executed, cause the processor to determine, based on the separation between the base of the respective stem and the respective uppermost leaves, a respective plant height of the respective plant.

In some examples, an example system for detecting crop biometrics includes an unmanned vehicle including at least one imaging device. The system includes a crop modeling device communicatively coupled to the imaging device. The crop modeling device includes a processor configured to receive, from the imaging device, a plurality of images of a crop of plants in a field. The processor is configured to generate, based on the plurality of images, a three-dimensional (3D) model of the plants. The 3D model defines locations and orientations of leaves and stems of the plants. The processor is configured to segment the 3D model to locate a respective stem and a respective plurality of leaves of each respective plant. The processor is configured to determine, based on the segmentation, a plurality of leaf-stem nodes of each respective plant. The processor is configured to determine, based on the leaf-stem nodes, at least one of a leaf count, a leaf angle, or an inter-nodal distance of each respective plant.

In some examples, an example technique for detecting crop biometrics includes receiving, by a processor, from an imaging device of an unmanned vehicle, a plurality of images of a crop of plants in a field. The technique includes generating, by the processor, based on the plurality of images, a three-dimensional (3D) model of the plants. The 3D model defines locations and orientations of leaves and stems of the plants. The technique includes segmenting, by the processor, the 3D model to locate a respective stem and a plurality of leaves of each respective plant. The technique includes determining, by the processor, based on the segmentation, a plurality of leaf-stem nodes of each respective plant. The technique includes determining, by the processor, based on the leaf-stem nodes, at least one of a leaf count, a leaf angle, or an inter-nodal distance of each respective plant.

In some examples, an example crop modeling includes a processor and a non-transitory computer readable storage medium. The storage medium includes instructions, that when executed, cause the processor to receive, from an imaging device of an unmanned vehicle, a plurality of images of a crop of plants in a field. The instructions, when executed, cause the processor to generate, based on the plurality of images, a three-dimensional (3D) model of the plants. The 3D model defines locations and orientations of leaves and stems of the plants. The instructions, when executed, cause the processor to segment the 3D model to locate a respective stem and a respective plurality of leaves of each respective plant. The instructions, when executed, cause the processor to determine, based on the segmentation, a plurality of leaf-stem nodes of each respective plant. The instructions, when executed, cause the processor to determine, based on the leaf-stem nodes, at least one of a leaf count, a leaf angle, or an inter-nodal distance of each respective plant.

In some examples, an example system for detecting crop biometrics includes an unmanned vehicle including at least one imaging device. The system includes a crop modeling device communicatively coupled to the imaging device. The crop modeling device includes a processor configured to receive, from the imaging device, a plurality of images of a crop of plants in a field. The processor is configured to generate, based on the plurality of images, a point cloud model of the leaf. The processor is configured to generate, based on the point cloud model, a self-organized map representing a surface of the leaf. The processor is configured to determine, based on the self-organized map, a total surface area of the leaf.

In some examples, an example technique for detecting crop biometrics includes receiving, by a processor, from an imaging device of an unmanned vehicle, a plurality of images of a crop of plants in a field. The technique includes generating, by the processor, based on the plurality of images, a point cloud model of the leaf. The technique includes generating, by the processor, based on the point cloud model, a self-organized map representing a surface of the leaf. The technique includes determining, by the processor, based on the self-organized map, a total surface area of the leaf.

In some examples, an example crop modeling includes a processor and a non-transitory computer readable storage medium. The storage medium includes instructions, that when executed, cause the processor to receive, from an imaging device of an unmanned vehicle, a plurality of images of a crop of plants in a field. The instructions, when executed, cause the processor to generate, based on the plurality of images, a point cloud model of the leaf. The instructions, when executed, cause the processor to generate, based on the point cloud model, a self-organized map representing a surface of the leaf. The instructions, when executed, cause the processor to determine, based on the self-organized map, a total surface area of the leaf.

The 3D models of the plants and the crop provides an alternative to existing cumbersome biometric estimation methodologies. The use of 3D models may provide an elevated information content, when compared to planar methods. For example, 3D point clouds may be generated based on high resolution images of plant (for example, corn stalks), and used to obtain 3D models. The 3D models may be used to determine one or more plant biometrics, for example, a total surface area and a leaf area index (LAI), plant height, or a leaf count, or other biometrics. Thus, plant biometrics detection according to the present disclosure may be useful for a better understanding of the needs of not only to the farm or crop as a whole, but also for individual plants, providing a higher granularity for potential treatment strategies.

The details of one or more examples are set forth in the accompanying drawings and the description below. Other features, objects, and advantages will be apparent from the description and drawings, and from the claims.

BRIEF DESCRIPTION OF DRAWINGS

FIGS. 22A-22C are images illustrating a progression of the Self-Organized Map of FIGS. 21A and 21B.

FIG. 24A shows a lateral view of six artificial corn stalks. FIG. 24B shows reconstruction of six artificial corn stalks. FIG. 24C shows the clusters created after the Euclidean distance based segmentation and the SKF based refinement step. FIG. 24D shows the projection of the reconstructed points on the ground plane. The overlap between the leaves is apparent and represents the occlusions among the leaves. Several images similar to FIG. 24A create a 3D point cloud (FIG. 24B). The segmented leaves (FIG. 24C) as well as the projection (FIG. 24D) are used to compute the nominator ($A_{GL}$) and denominator ($A_{PGL}$) of the LAI.

FIGS. 25A-25C are images of extreme cases of reconstructed leaves.

DETAILED DESCRIPTION

The disclosure describes example systems, techniques, and devices for detecting crop biometrics. In some examples, crop biometrics as described herein may refer to plant phenotyping.

Figure 1:
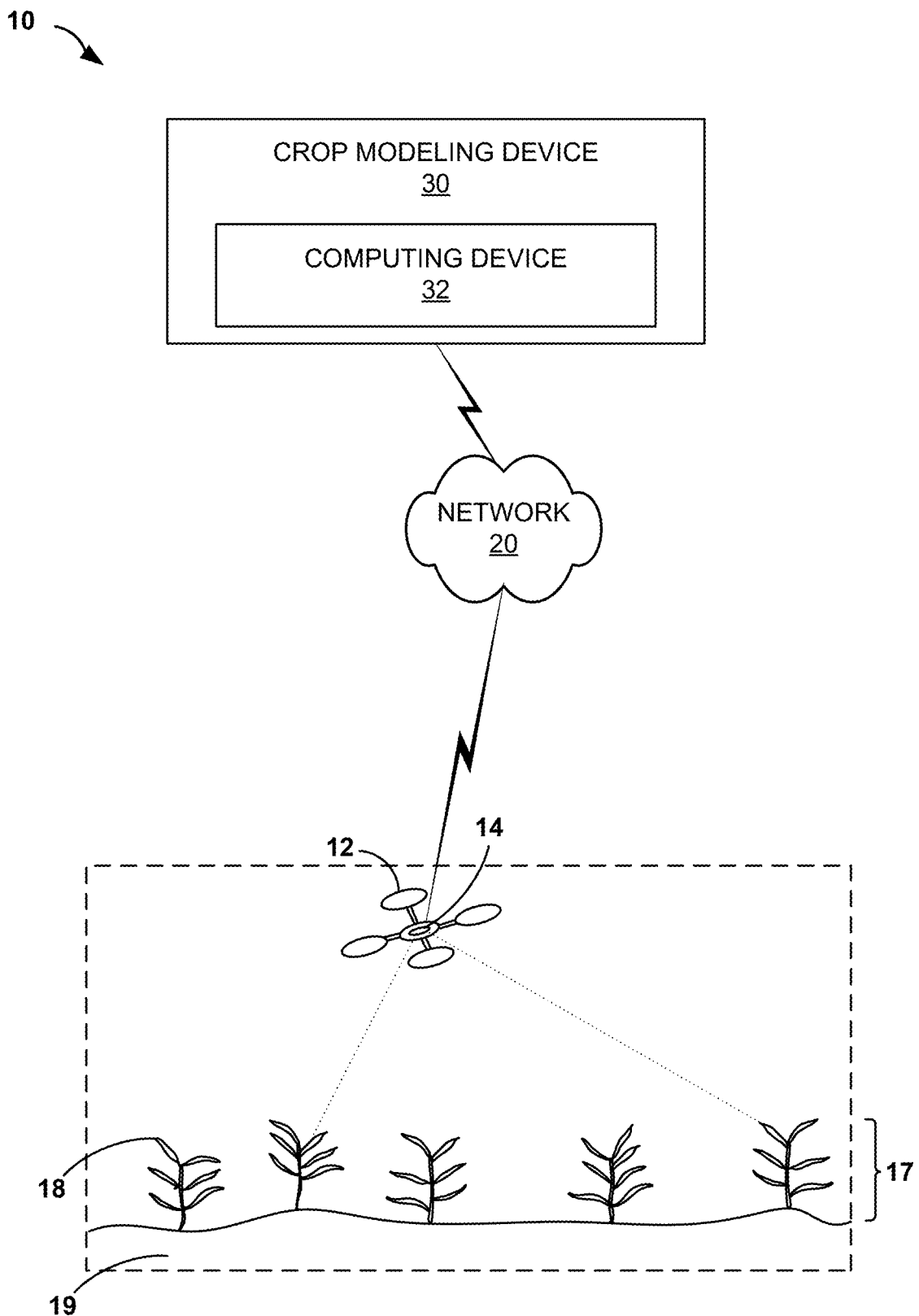
FIG. 1 is a conceptual and schematic diagram of a system including an unmanned vehicle and a crop modeling device for imaging crops in a field.

FIG. 1 is a conceptual and schematic diagram of a system 10 including an unmanned vehicle 12 and a crop modeling device 30 for imaging crops 17 in a field 19. Crops 17 may include a plurality of plants 18. Plurality of plants 18 may include plants of the same species or variety, or different plants. For example, crops 17 may include corn, soy, wheat, rice, or any other predetermined crop plants. In some examples, plurality of plants 18 includes corn. For example, the corn may be in any predetermined stage of growth. In some examples, the corn may be in a stage of growth including "V3" through "V8", based on the V-numbering system used to define corn growth stages.

Unmanned vehicle 12 may include at least one imaging device 14 for imaging crops 17, plurality of plants 18, or field 19. For example, imaging device 14 may image individual plants of plurality of plants 18 or portions or regions of individual plants, or may image more than one plant and its surrounding environment (for example, soil), or a portion or region of crops 17 or of field 19. Imaging device 14 may include a charge coupled device (CCD) sensor, a complementary metal oxide semiconductor (CMOS sensor), an infra-red sensor, an ultraviolet sensor, a visible light sensor, or any other suitable imaging sensor. Imaging device 14 may capture individual images, or a burst of images, a predetermined temporal sequence of images, or capture a continuous video from which images may be retrieved. While a single imaging device 14 is shown in FIG. 1, in other examples, unmanned vehicle 12 may include a plurality of imaging devices 14. In some examples, imaging device 14 may include a memory (not shown) to store images. In some examples, imaging device 14 may be communicatively coupled to a network 20 by wired or wireless communication media, and images captured by imaging device 14 may be ultimately stored on network 20, or in a storage of crop modeling device 30 or a computing device 32.

Unmanned vehicle 12 may include any vehicle on which imaging device 14 may be mounted or secured, and which may move between, over, about, around, under, along, or across, crops 17, plants 18, or field 19. In some example, unmanned vehicle 12 may move along a predetermined path under manual or automatic control, and imaging device 14 may capture a plurality of images as unmanned vehicle 12 moves along the predetermined path. In some examples, unmanned vehicle 12 may include a bracket (not shown) for mounting imaging device 14. In some examples, the bracket is fixed, in which chase unmanned vehicle may translate or rotate to change the field of view of imaging device 14. In other examples, the bracket may be movable, and the bracket may translate or rotate to change the field of view of imaging device 14. In some examples, unmanned vehicle 12 includes an unmanned aerial vehicle, for example, a fixed wing or a rotary drone. In the example shown in FIG. 1, system 10 includes a 4-winged rotary drone. In other examples, unmanned vehicle 12 includes an unmanned ground vehicle, for example, a ground robot, or self-driving car. While various examples according to the disclosure are described with reference to unmanned vehicle 12, in some examples, imaging device 14 may be mounted or secured to a manned vehicle or structure, and the manned vehicle or structure may travel along a predetermined path, for example, under direct or indirect manual control or supervision. Thus, the plurality of images may include images taken at different locations and different orientations along field 19 or adjacent to field 19. In some examples, the plurality of images includes images taken at different locations and different orientations along a substantially circular predetermined path about field 19.

In some examples, crop modeling device 30 is communicatively coupled to imaging device 14. For example, crop modeling device 30 may be coupled to imaging device 14 through network 20, or any suitable wired or wireless connection. While crop modeling device 30 is shown distinct and separate from unmanned vehicle 12 in example system 10 shown in FIG. 1, in other examples, unmanned vehicle 12 may include crop modeling device 30. For example, crop modeling device 30 may be housed within a housing of unmanned vehicle 12 or may be housed within a housing mounted on or secured to unmanned vehicle 12. The function of crop modeling device 30 is described with reference to FIGS. 1 and 2.

Figure 2:
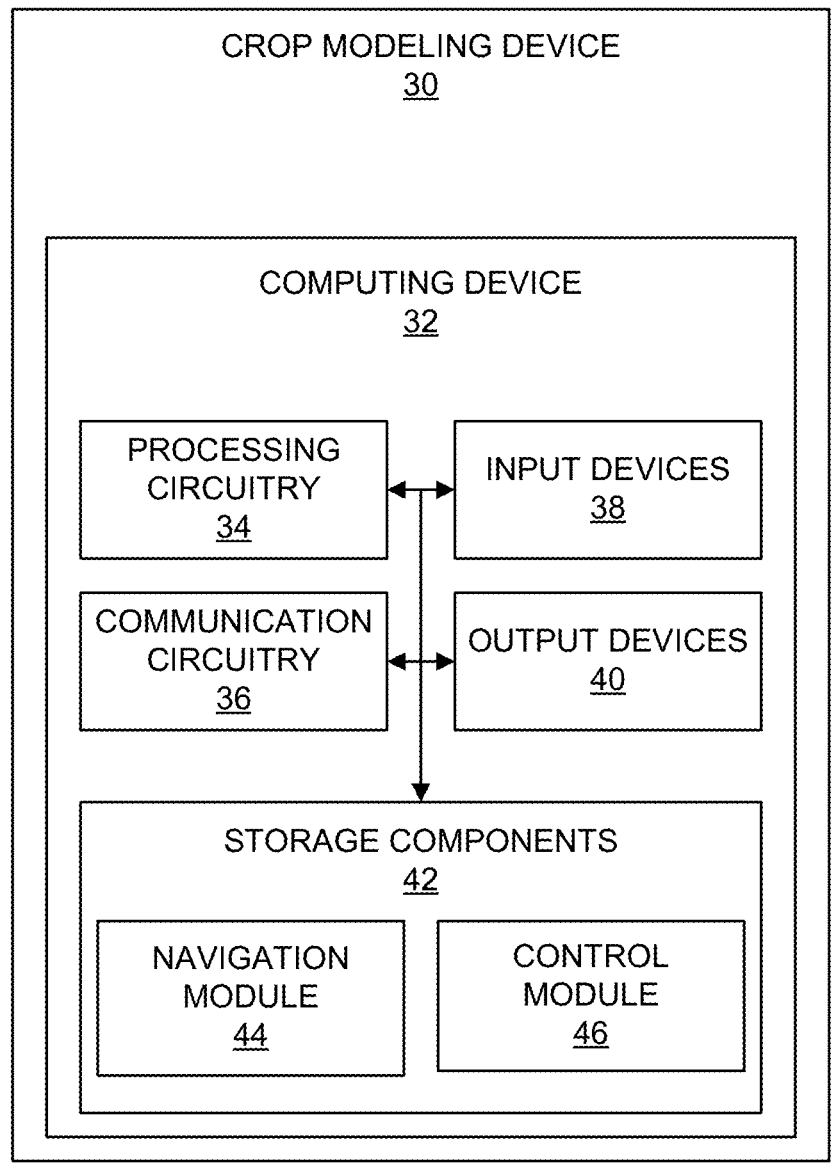
FIG. 2 is a conceptual and schematic diagram of the crop modeling device of FIG. 1.

FIG. 2 is a conceptual and schematic diagram of crop modeling device 30 of FIG. 1.

Crop modeling device 30 receives images captured by imaging device 14, and may ultimately generate a three-dimensional (3D) model of the crops 17, of plants 18, or of field 19, based on the plurality of images. In some examples, the 3D model defines locations and orientations of leaves and stems of plants 18. Crop modeling device 30 may further determine at least one biometric parameter, for example, plant height, leaf count, or another predetermined biometric parameter, of at least one plant, for example, individual plants of crops 17, or of aggregate plants 18 in field 19. Crop modeling device 30 may include a computing device 32 that processes the plurality of images. In some examples, system 10 of FIG. 1 may not include a separate crop modeling device 30, and functions described with reference to crop modeling device 30 or computing device 32 may be performed by unmanned vehicle 12. For example, unmanned vehicle 12 itself may optionally include computing device 32.

Computing device 32 includes processing circuitry 34 (also referred to as a processor), coupled to one or more of one or more communication circuitry 36, one or more input devices 38, one or more output devices 40, or one or more storage components 42. Processing circuitry 34 may include more than one processor. Examples of processing circuitry 34 may include, any one or more of a microprocessor, a controller, a digital signal processor (DSP), an application specific integrated circuit (ASIC), a field-programmable gate array (FPGA), or equivalent discrete or integrated logic circuitry.

Communication circuitry 36 may include a network interface card, such as an Ethernet card, an optical transceiver, a radio frequency transceiver, or any other type of device that can send and receive information. Other examples of such network interfaces may include Wi-Fi radios or Universal Serial Bus (USB). In some examples, crop modeling device 30 utilizes communication circuitry 36 to wirelessly communicate with an external device such as unmanned vehicle 12 or imaging device 14.

Input devices 38, in some examples, are configured to receive input from a user through tactile, audio, or video sources. Examples of input devices 38 include a mouse, a keyboard, a voice responsive system, video camera, microphone, touchscreen, a control panel including one or more switches, knobs, or potentiometers, or any other type of device for detecting a command from a user.

Output devices 40, in some examples, are configured to provide output to a user using audio or video media. For example, output devices 40 may include a display, a sound card, a video graphics adapter card, or any other type of device for converting an output signal into an appropriate form understandable to humans or machines. In some examples, output device 40 may include a display configured to display a representation of crop 17, plants 18, field 19, or a point cloud reconstruction or 3D thereof, or of one or more plant biometrics associated with respective plants.

Storage components 42 may include at least one non-transitory computer storage medium that may store instructions, and the processor may execute the instructions to perform predetermined tasks. The same storage medium or different storage medium of storage components 42 may also store the plurality of images, and the 3D model generated based on the plurality of images.

In some examples, storage components 42 may optionally include a navigation module 44 that may store instructions to guide the navigation of unmanned vehicle 12. For example, navigation module 44 may guide the movement of unmanned vehicle 12 along a predetermined path to image predetermined portions or regions of crop 17, plants 18, or field 19. In some examples, storage components 42 may optionally include a control module 46 to control the propulsion or movement of unmanned vehicle 12, for example, in conjunction with navigation module 44, or based on instructions from processing circuitry 34. For example, processing circuitry 34 may send instructions to control module 46 to cause unmanned vehicle 12 to trigger imaging of imaging device 14 to capture images at predetermined times or intervals along a path of unmanned vehicle 12.

Example techniques according to the disclosure are described with reference to system 10 and crop modeling device 30. However, example techniques can be performed by any suitable system or detection or computing device.

Figure 3:
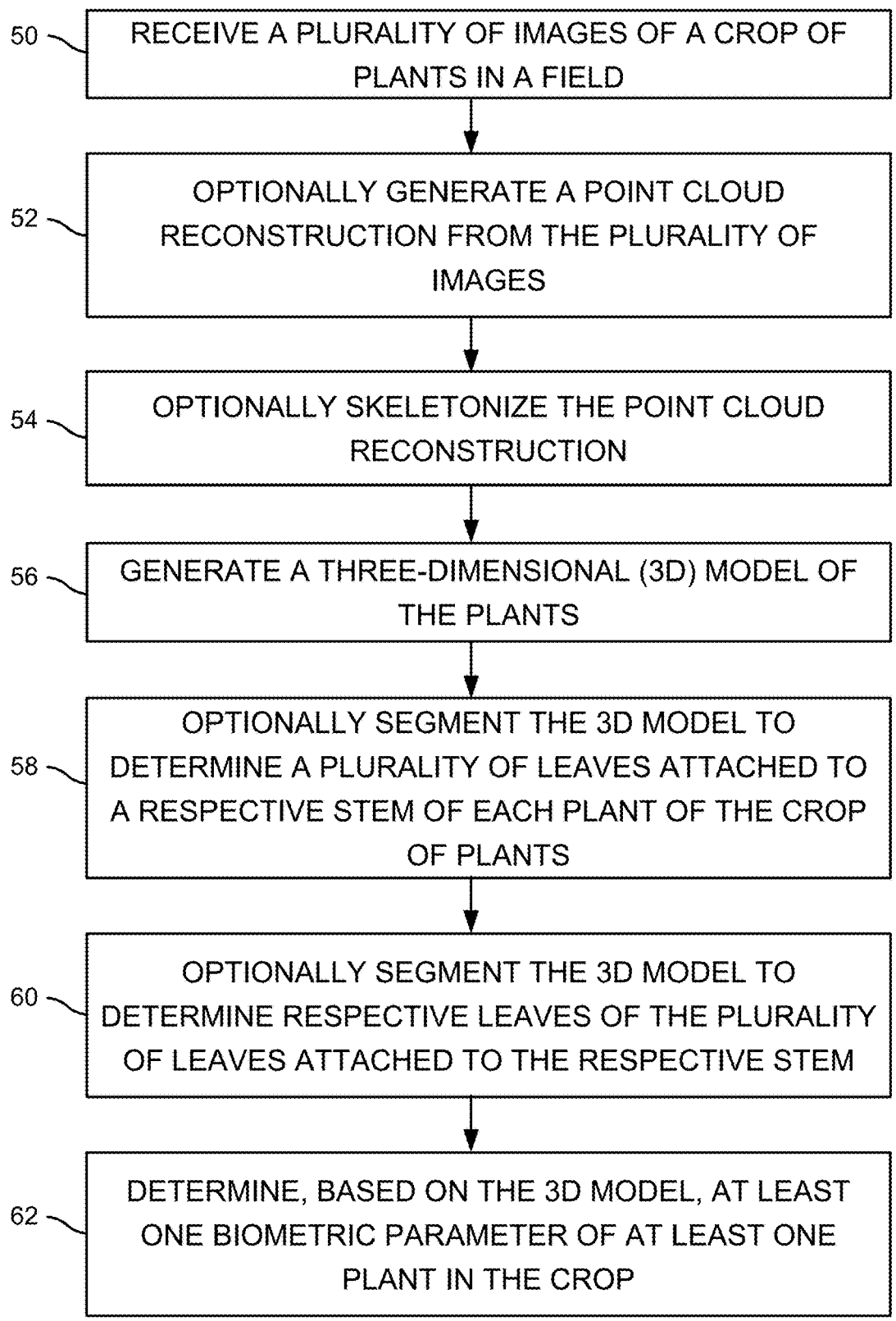
FIG. 3 is a flow diagram of an example technique for detecting crop biometrics.

FIG. 3 is a flow diagram of an example technique for detecting crop biometrics. In some examples, the example technique includes, receiving, by processing circuitry 34, from imaging device 14 of unmanned vehicle 12, a plurality of images of crop 17 of plants 18 in field 19 (50). Processing circuitry 34 may receive the plurality of images relatively immediately after they are captured by imaging device 14, for example, via network 20. In some examples, processing circuitry 34 may receive the plurality of images after a predetermined delay, or after any suitable period of time at which the plurality of images is captured, for example, from a storage medium in which the plurality of images captured by imaging device 14 are stored.

The example technique may optionally include generating, by processor circuitry 34, based on the images, a point cloud reconstruction of plants 18 (52). For example, each point of the point cloud reconstruction may be represented by three spatial dimensions, and three chromatic dimensions, representing chromatic values associated with spatial dimensions. In some examples, chromatic values indicative of a green or greenish hue may indicate the presence of a portion of a plant at a particular spatial location, while chromatic values indicative of a brown or brownish hue may be indicative of soil. In some examples, processor 34 may use any known "structure-from-motion" technique to generate the point cloud representation from the plurality of images. For example, the plurality of images may include images of the same, adjacent, or overlapping regions of field 19 captured from different orientations and distances, and the "structure-from-motion" technique may generate a point cloud reconstruction based on the captured images. However, the point cloud reconstruction may include a relatively irregular distribution of points, for example, a relatively dense distribution of points in regions of which relatively many images are captured, and a relatively sparse distribution of points in regions of which relatively few images are captured. Processing circuitry 34 may therefore further process the point cloud reconstruction.

For example, the example technique may optionally include skeletonizing, by the processor, the reconstruction to reduce the number of points in the point cloud reconstruction (54). In some examples, the skeletonizing (54) may including replacing a relatively dense cluster of points with a reduced number of points, for example, a single point, representing the cluster. In some examples, the single point may be located at an average of the locations of points within the cluster, or any suitable statistical representation of the cluster of points. In some examples, the skeletonizing (54) may include generating two-dimensional (2D) orthogonal slices of the point cloud reconstruction, generating reduced points in each 2D slice, and combining the reduced points into a skeletonized reconstruction.

The example technique includes generating, by processing circuitry 34, based on the plurality of images, a three-dimensional (3D) model of the plants (56). The processing circuitry 34 may generate the 3D model from the optional point cloud reconstruction, or otherwise indirectly or directly based on the plurality of images. The 3D model may define locations and orientations of leaves and stems of plants 18. In some examples, the 3D model includes a plurality of labels, each respective label of the plurality of labels associated with a respective element of the 3D model. Each label may define the respective element of the 3D model as being part of a stems, a leaf, or soil. For example, processing circuitry 34 may label an element associated with a green or greenish hue as being a stem or a leaf, and may label an element associated with a brown or brownish hue as being soil.

The example technique of FIG. 3 may optionally include further processing the 3D model. For example, when the 3D model is first developed, the model may only identify elements as being soil or plant, and further processing may be needed to determine whether a portion of a plant belongs to a leaf or a stem. In some examples, the example technique of FIG. 3 optionally further includes, by processing circuitry 34, segmenting the 3D model to determine a plurality of leaves attached to a respective stem of each plant 18 of the crop 17 (58). For example, a RAndomly Intercepted Nodes (RAIN) algorithm may be used to determine leaves associated with respective stems. In some examples, processing circuitry 34 may follow a path from one end of a stem to another end of a stem, and determine leaves joined to the stem along that path, or may determine leaf-node stems along the path, to determine a plurality of leaves associated with a particular stem.

In some examples, the 3D model may include occluding or overlapping leaves, such that in an initial form, the 3D model may represent multiple leaves as being a single leaf. In some such examples, the example technique may optionally include further segmenting, by processing circuitry 34, the 3D model to determine respective leaves of the plurality of leaves attached to the respective stem (60). For example, processing circuitry 34 may determine end points and intersecting nodes in the representation of leaves in the 3D model, and may determine overlapping, occluding, or intersecting leaves based on the locations and distributions of the end points and intersecting nodes.

The 3D model may be used to determine one or more biometric parameters associated with crop 17 as a whole or one or more plants 18. For example, the example technique of FIG. 3 may include determining, by processing circuitry 34, based on the 3D model, at least one biometric parameter of at least one plant 18 in crop 17 (62). The technique may further include displaying a representation of one or both of the 3D model or the biometric parameter. For example, the biometric parameter may be represented by a numeric or alphanumeric representation, or a graphical icon, or a colored representation or icon, overlaid on the 3D model. For example, biometric parameters associated with a respective plant of plants 18 or a respective portion of the plant may be overlaid on a display of the 3D model adjacent the respective plant or portion of the plant.

The biometric parameters may include one or more of a plant height, a leaf count, a leaf angle, an inter-nodal distance, a total surface area, or any suitable biometric parameter.

Figure 4:
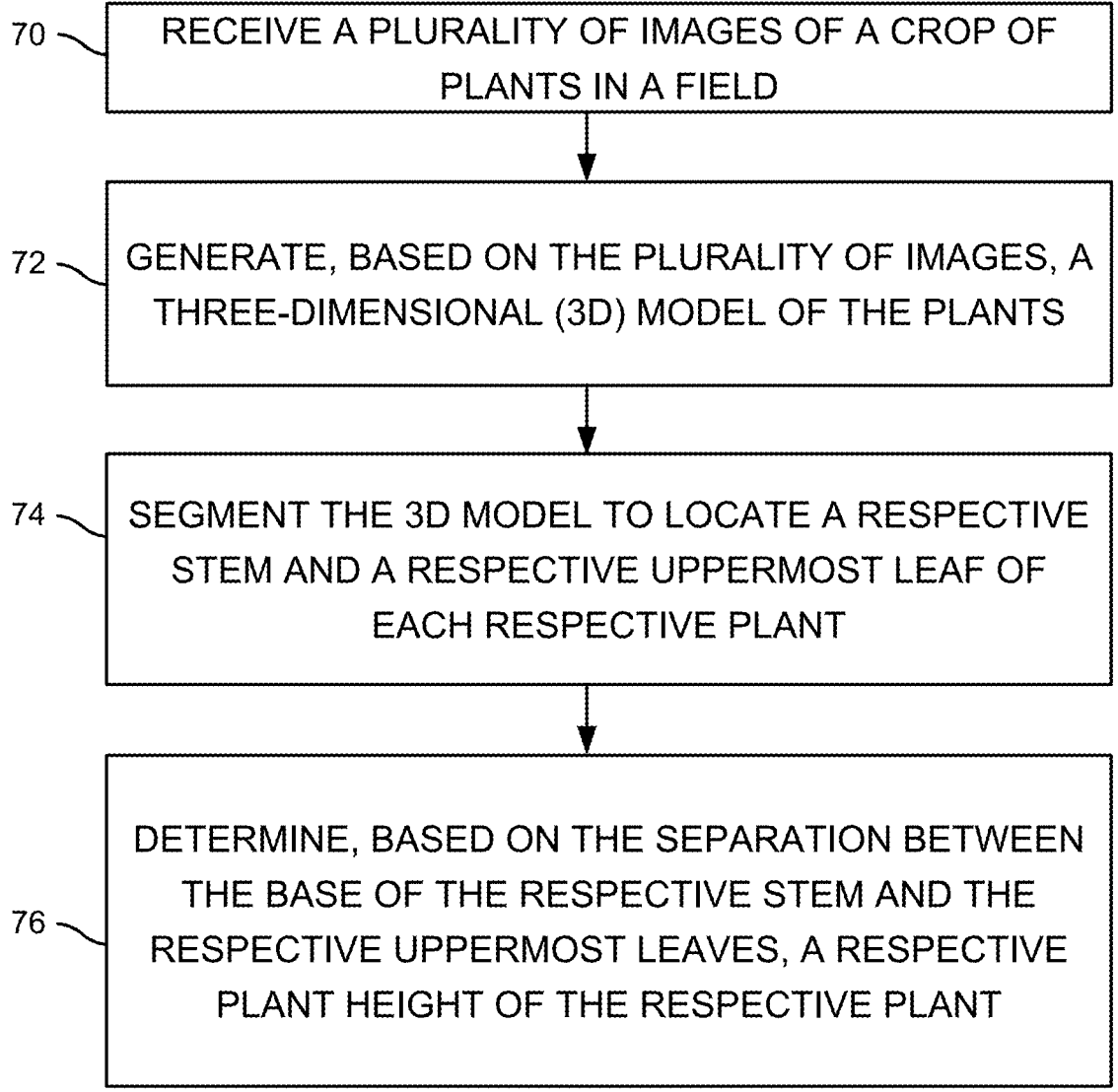
FIG. 4 is a flow diagram of an example technique for detecting a crop biometric including a plant height.

FIG. 4 is a flow diagram of an example technique for detecting a crop biometric including a plant height. In some examples, the example technique for detecting crop biometrics includes receiving, by processing circuitry 34, from imaging device 14 of unmanned vehicle 12, a plurality of images of crop 17 of plants 18 in field 19 (70). The receiving (70) may be substantially similar to the receiving (50) described with reference to FIG. 3. The example technique includes generating, by processing circuitry 34, based on the plurality of images, a three-dimensional (3D) model of plants 18 (72). The generating (72) may be substantially similar to the generating (56) described with reference to FIG. 3. The example technique includes segmenting, by processing circuitry 34, the 3D model to locate a respective stem and a respective uppermost leaf of each respective plant 18 (74). The segmenting (74) may be similar to or include one or both of the segmenting (58) and the segmenting (60) described with reference to FIG. 3. The example technique includes determining, by processing circuitry 34, based on the separation between the base of the respective stem and the respective uppermost leaves, a respective plant height of each respective plant 18 (76). For example, the separation may be the linear distance between an uppermost point of the uppermost leaf, and a lowermost point of the stem. In some examples, the determining (76) the separation between the base of the respective stem and the respective uppermost leaf may include determining an average lowest point for a predetermined plurality of plants adjacent to and comprising the respective plant. For example, the lowermost points for each of a plurality of plants adjacent to a respective plant may be determined, and an average of the lowermost points may be compared with the lowermost point of the respective plant. If the average is the same as or within a predetermined threshold of the lowermost point of the respective plant, then the lowermost point of the respective plant may be used to determine the separation. However, if the average is beyond a predetermined threshold of the lowermost point, then the average may be used to determine the separation. Thus, a plant biometric such as a plant height may be determined by the example technique of FIG. 4.

Figure 5:
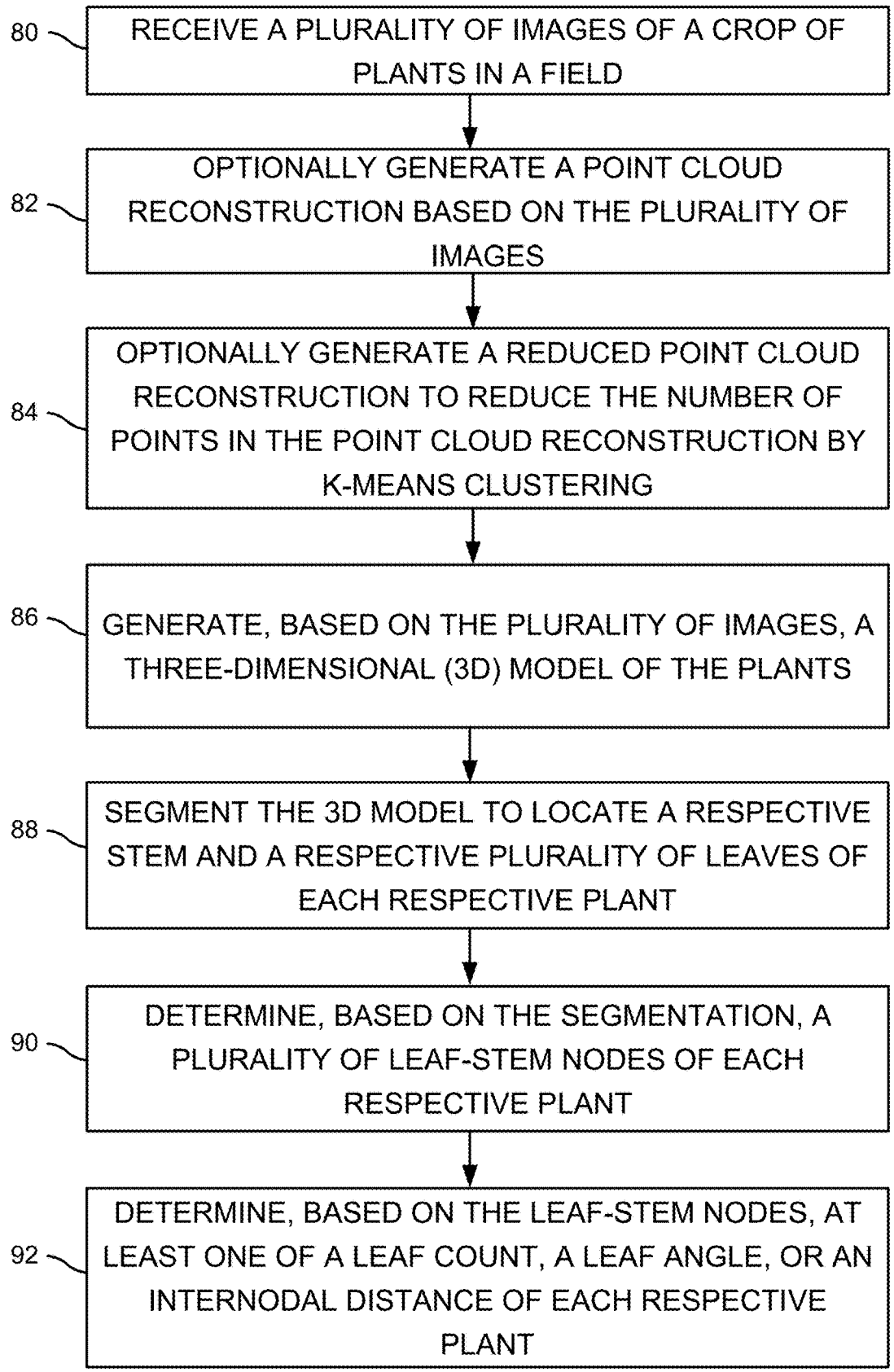
FIG. 5 is a flow diagram of an example technique for detecting a crop biometric including at least one of a leaf count, a leaf angle, and an inter-nodal distance.

FIG. 5 is a flow diagram of an example technique for detecting a crop biometric including at least one of a leaf count, a leaf angle, and an inter-nodal distance. In some examples, the example technique of FIG. 5 for detecting crop biometrics includes receiving, by processing circuitry 34, from imaging device 14 of unmanned vehicle 14, a plurality of images of crop 17 of plants 18 in field 19 (80). The receiving (80) may be substantially similar to the receiving (50) described with reference to FIG. 3.

In some examples, the example technique of FIG. 5 optionally includes generating, by processing circuitry 34, a point cloud reconstruction based on the plurality of images (82). Generating the point cloud reconstruction (82) may be substantially similar to the generating (52) described with reference to FIG. 3. In some examples, the example technique of FIG. 5 optionally includes generating, by processing circuitry 34, a reduced point cloud reconstruction to reduce the number of points in the point cloud reconstruction by k-means clustering (84). In some such examples, the example technique may include generating, by processing circuitry 34, a 3D model based on the reduced point cloud reconstruction (86). In some examples, the example technique may not include generating a point cloud or a reduced point, and processing circuitry may otherwise generate the 3D model (86). The generating the 3D model (86) may be substantially similar to the generating (56) described with reference to FIG. 3.

The example technique of FIG. 5 may further include segmenting, by processing circuitry 34, the 3D model to locate a respective stem and a plurality of leaves of each respective plant (88). The segmenting (88) may be similar to or include one or both of the segmenting (58) and the segmenting (60) described with reference to FIG. 3. The example technique of FIG. 5 may further include determining, by processing circuitry 34, based on the segmentation, a plurality of leaf-stem nodes of each respective plant 18 (90). Processing circuitry 34 may further determine one or more plant biometrics from the location, orientation, or placement of the leaf-stem nodes along the stem. For example, the example technique of FIG. 5 may include determining, by processing circuitry 34, based on the leaf-stem nodes, at least one of a leaf count, a leaf angle, or an inter-nodal distance of each respective plant (92).

Thus, at least one plant biometric may be determined by the example technique of FIG. 5.

Figure 6:
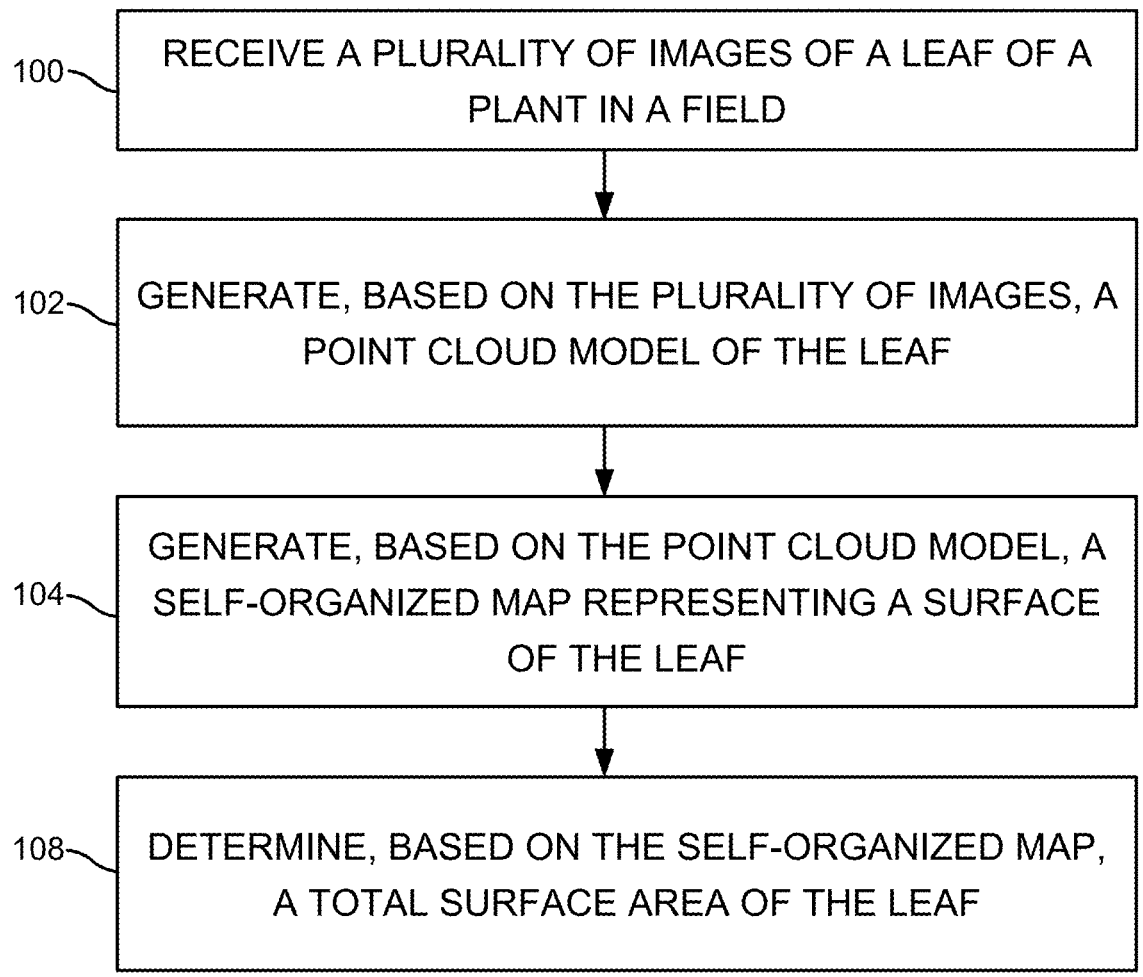
FIG. 6 is a flow diagram of an example technique for detecting a crop biometric including a total surface area.

FIG. 6 is a flow diagram of an example technique for detecting a crop biometric including a total surface area. In some examples, the example technique of FIG. 6 for detecting crop biometrics includes receiving, by processing circuitry 34, from imaging device 14 of unmanned vehicle 14, a plurality of images of crop 17 of plants 18 in field 19 (90). The receiving (90) may be substantially similar to the receiving (50) described with reference to FIG. 3. The example technique of FIG. 6 includes generating, by processing circuitry 34, based on the plurality of images, a point cloud model of the leaf (102). Generating the point cloud model (102) may be substantially similar to the generating (52) described with reference to FIG. 3. The example technique of FIG. 6 may further include generating, by processing circuitry 34, based on the point cloud model, a self-organized map representing a surface of the leaf (104). The example technique may further include determining, by processing circuitry 34, based on the self-organized map, a total surface area of the leaf (106). The total surface area may be used to determine a leaf area index (LAI) of a respective plant. For example, the total area may be determined by determining and summing the total surface area of each respective leaf to determine an "area of green leaves". Further, a "projected" area may be determined by projecting the area of the respective leaves on a plane (for example, the ground). The ratio of the "area of green leaves" to the "area of projected green leaves" may provide the LAI.

While the example techniques of FIGS. 4 to 6 have been described with reference to system 10, crop modeling device 30, and computing device 32, of FIGS. 1 and 2, the example techniques may be performed using any suitable systems or devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

A series of tests were performed to evaluate aspects of the present disclosure. The tests and associated discussion in Sections 4 and 5 below illustrate aspects of some examples of the disclosure but do not limit the scope.

Section 4—3D Segmentation of Corn Plants

There was a believed need for accurate and frequent plant biometrics estimation. An accurate model of the canopy can reveal important information regarding the state of crops and provide feedback to growth models. For agricultural applications, measurements such as the biomass or the angle of the leaves with respect to the stem may be powerful indicators connected to the crops' health, growth state, and ability to photosynthesize efficiently.

In contrast to some invasive methods for accurate biomass calculation that rely on plant deconstruction, non-invasive alternatives are preferred in some instances, e.g., in commercial applications since they leave the crops intact. Such non-invasive alternatives may approximate the real biometrics based on mathematical models and sparse measurements collected randomly throughout the field. Such approaches may be inherently problematic since the average of several measurements provides a single result that characterizes a wide area. The spatial sparsity in combination with the use of cumbersome sensors which are handled by a human may impose significant constrains in the sampling process; collecting measurements for a large number of points over the field can be prohibitive, costly and inaccurate.

An automated methodology for providing detailed and reliable information from 3D models of corn canopies may directly address the needs of both researchers and companies interested in corn development. The following discussion proposes a methodology capable of estimating the biometrics of a group of plants using their 3D models. The following sections explore a pipeline that may be able to consume 3D reconstructions of crops in the field and provide measurements with a granularity and frequency that have not been available to the agriculture community before.

Figure 7:
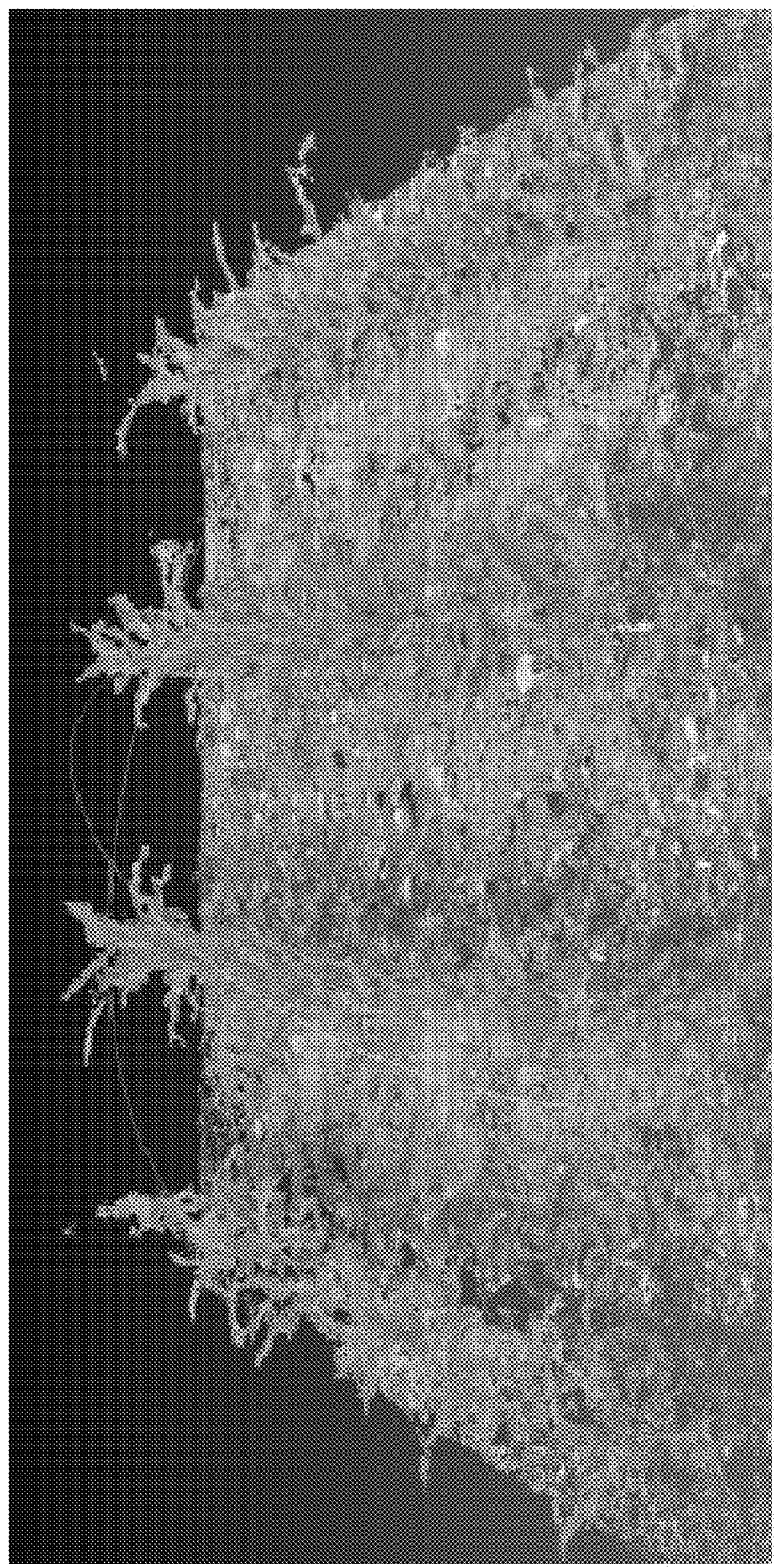
FIG. 7 is an example of a 3D model reconstructed by imagery. A four row segment of corn plants at "V5" growth stage.

When a 3D model such as that shown in FIG. 7 is accessible, the surface of all of its leaves should be observable, overcoming the leaf occlusions and resulting in a more accurate volumetric information about the plant. In some examples of the disclosure, the proposed methodology may focus on maize of growth stages between "V3" and "V8", when the plants are still susceptible to treatment and introduces the first attempt for a low-cost, mobile, and easily deployable solution for automated computation of the plant's biometrics.

4.1 Methodology

Figure 8:
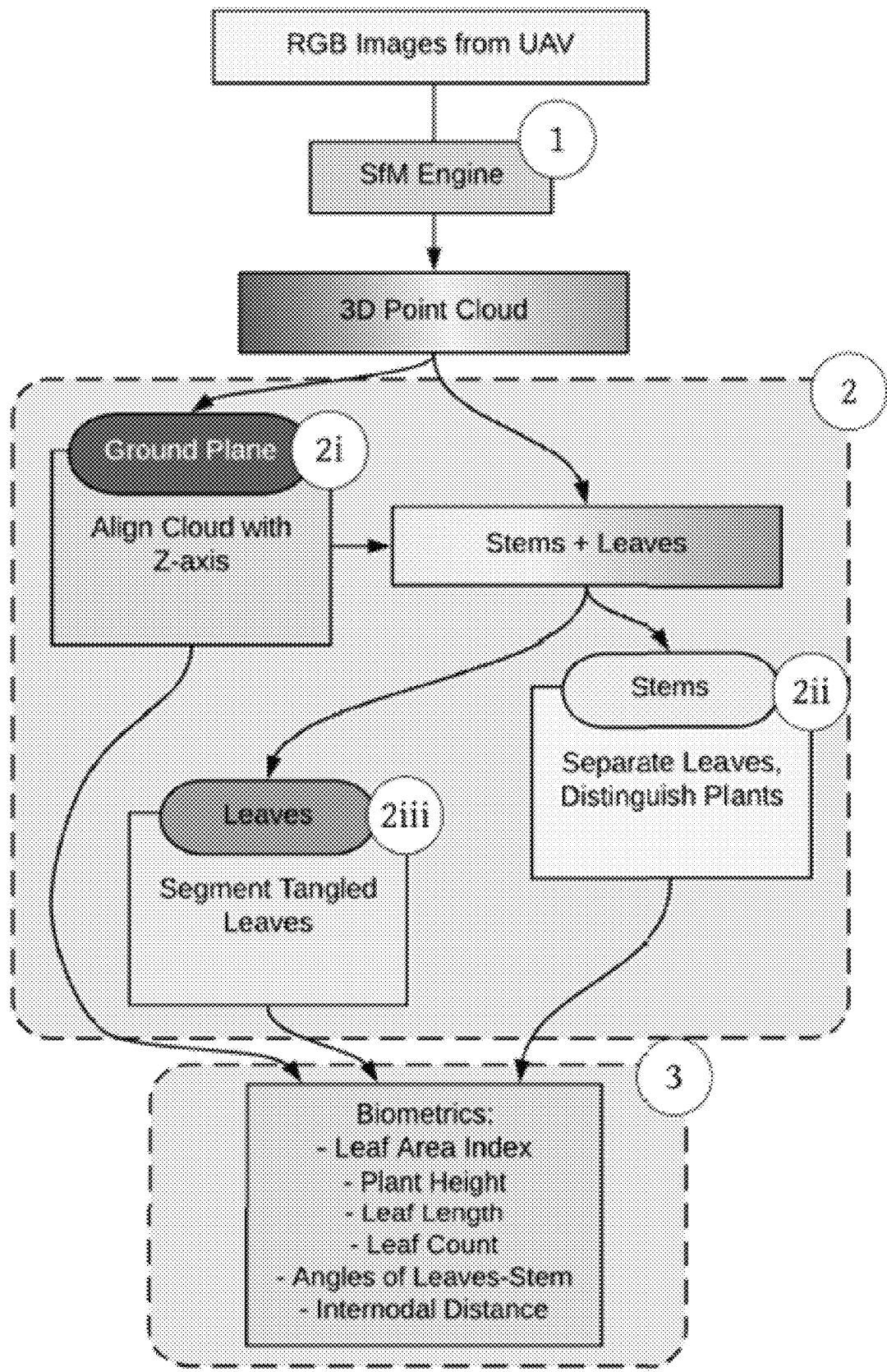
FIG. 8 is a diagram that visualizes the proposed pipeline for the segmentation and biometrics extraction from a set of images acquired by a camera mounted on a UAV.

This section provides an introduction to the basic framework used in this analysis and enumerates the main steps of the pipeline for the manipulation of the 3D reconstructions and the extraction of the biometrics. Following the diagram illustrated in FIG. 8, the pipeline may be subdivided in three main steps: Step 1. the 3D reconstruction that uses a Structure from Motion (SfM) software to transform the high resolution images to a 3D model; Step 2. the segmentation step that assigns labels to the parts of the 3D reconstruction and more specifically (2.i) the ground, (2.ii) the stems, and (2.iii) the individual leaves, and Step 3. the computation of the biometrics that takes advantage of the segmentation step to combine the geometries of stems and leaves and extract measurements and statistics.

Figure 9:
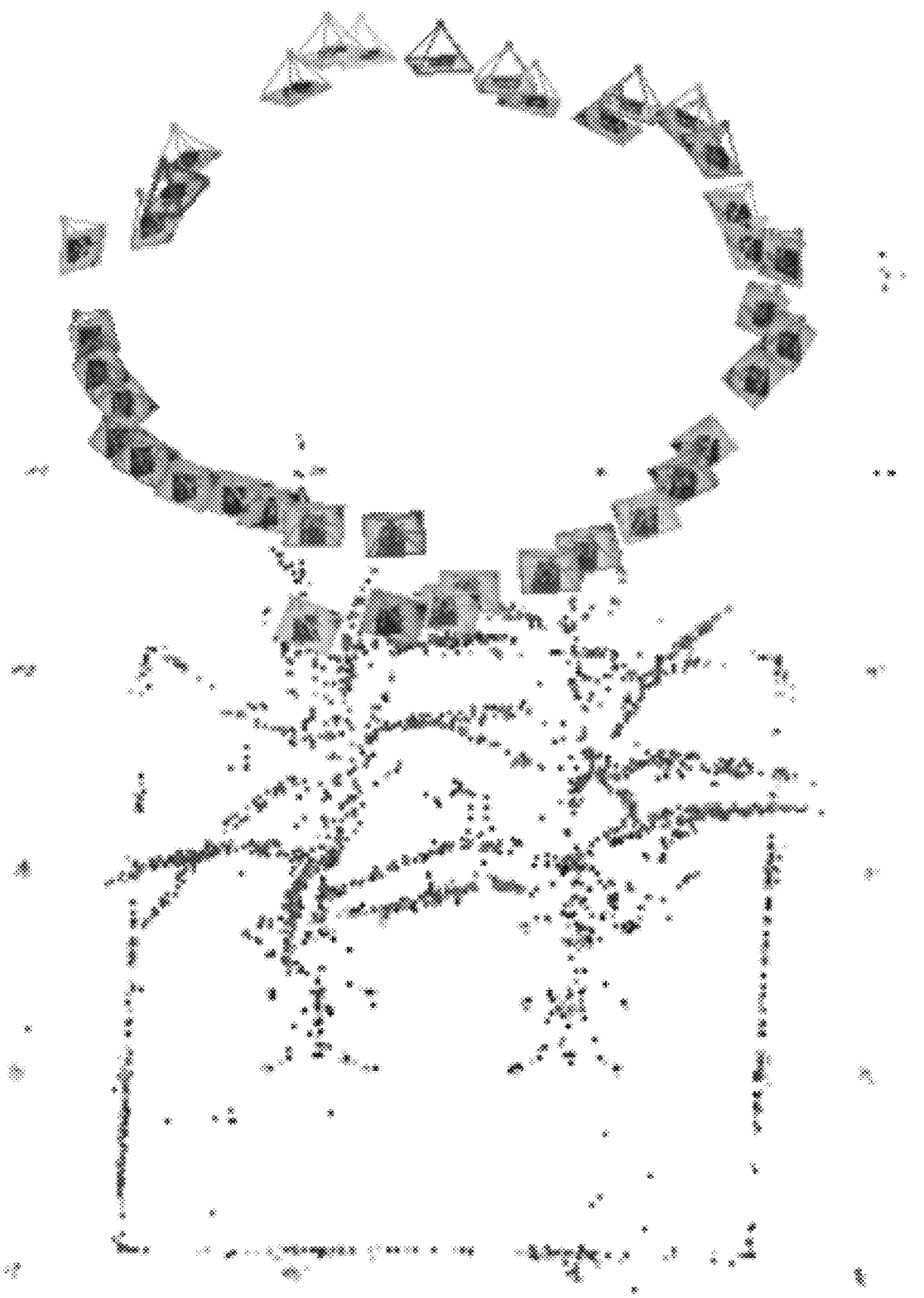
FIG. 9 is a sparse reconstruction resulting from VisualSFM software. In the non-limiting example, several high resolution images were taken using a handheld camera while moving in a circular fashion around six artificial corn stalks.

The core methodology for the segmentation as presented in this discussion requires a dense 3D reconstruction of a group of plants. This can be obtained by capturing high resolution images of the targeted group while moving in a circular fashion as seen in FIG. 9 and employing a 3D reconstruction toolbox. Obtaining the 3D reconstruction is decoupled from its processing and does not impose any platform constraints—it may only require an RGB sensor and sufficient computation capabilities. It is possible to acquire the necessary imagery through handheld or UAV mounted cameras.

The extracted 3D reconstruction has the form of a collection of points, known as a point cloud, P. Each point p of the point cloud has a physical representation in 3D space and is expressed by a vector of three values along the x, y, and z axis. Associated with each p are three more values that reflect the r, g, and b chromas of the red, green, and blue channels. Consecutively, each point can be represented as:

$$p = [x, y, z, r, g, b]. \tag{4.1}$$

The complexity of the outdoor crop field is apparent in the obtained 3D object 4.1 and requires an initial segmentation step able to separate the scene into the main components. Three main semantic categories may be defined that are used as building blocks for any biometric extraction; the soil, the stems, and the leaves. The soil represents the background and usually takes a significant portion of the generated 3D model. It may be useful for the separation between plants and facilitates the alignment of the point cloud along the z-axis. The stem is the skeleton of each plant, holds information on the number of plants, their row spacing and height, and it is the connecting element between all the leaves of the same plant. Finally, the leaves are the main semantic elements of our analysis since they comprise the majority of the biomass of a plant and reveal its ability to photosynthesize.

The subsequent sections present the dataset that was used for the testing and validation, as well as the algorithms that constitute the segmentation pipeline.

4.2 Preprocessing

Each time a 3D reconstruction is provided, a series of steps transform it into an input that is compatible to the manipulation pipeline. These transformations attempt to alleviate the inherent shortcomings of the SfM.

4.2.1 Scaling The 3D reconstruction resulting from an SfM algorithm is up-to-scale equivalent to the actual scene, which means that any geometric computations performed on the reconstructed scene are not directly comparable to real world measurements. Furthermore, this discrepancy is different for every 3D reconstruction forcing the selection of different algorithmic constants at each execution. One solution in determining the scaling factor s of the reconstruction in order to correct the geometric inconsistencies and verify the correctness of our computations is to compare the inter-row distance of the real world corn plants $h_{real}$ against the inter-row distance of the reconstructed corn plants $h_{reconstructed}$. This scaling ratio is applied to the whole point cloud and is computed as:

$$s = \frac{h_{real}}{h_{reconstructed}}. \tag{4.2}$$

Figure 10:
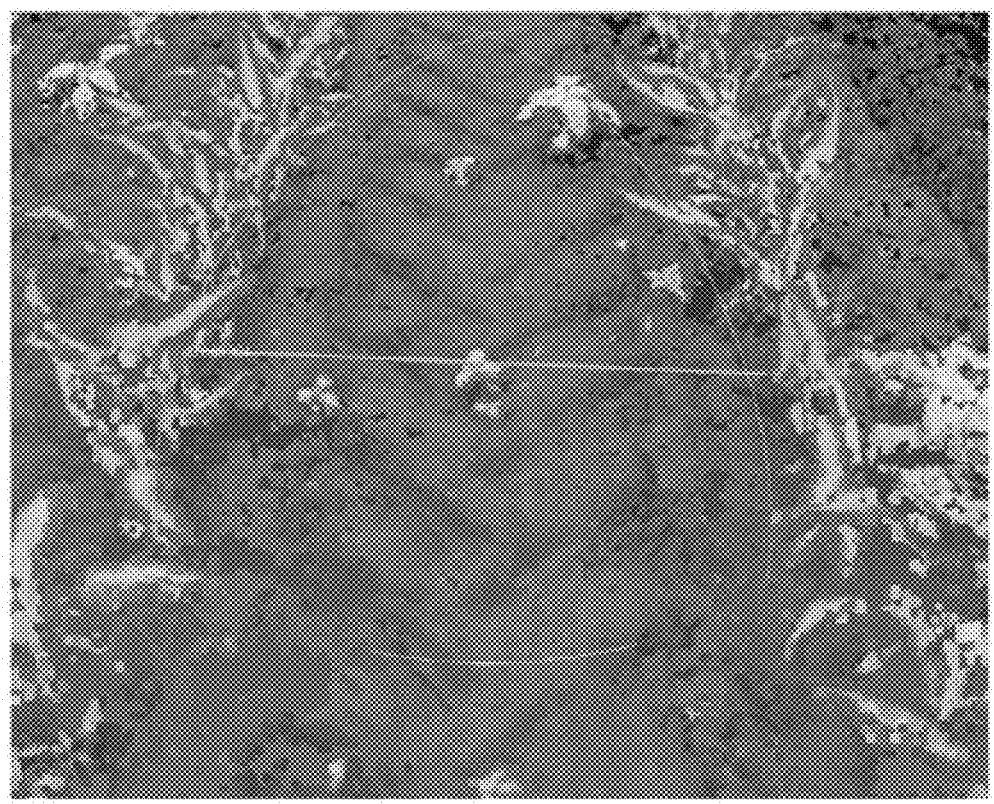
FIG. 10 is an example image of a user selecting an inter-row distance. The user is prompted to use an interactive tool such as MeshLab 1 to measure the inter-row distance of the reconstruction. An example real world distance is, e.g., 22 or 30 inches for Minnesota.

The inter-row distance was chosen as one of the most reliable constants in a field; during the planting, farmers select this distance and the tractors are configured to accurately follow it. As seen in FIG. 10, the user is prompted to measure the distance between rows with a 3D interactive tool. This interaction needs to take place for each new reconstruction.

4.2.2 Point Cloud Alignment When the plant stems assume a position nearly perpendicular to the x-y plane and the ground is translated to match the x-y plane, several geometric priors can be utilized efficiently to reduce the complexity of the subsequent steps. That is why, after the scaling it was desired to rotate the point cloud perpendicular to the z-axis and locate its ground plane.

Initially, the color information of each point was used to perform a color clustering that separates the brown from green points using an algorithm. This step resulted into two point clouds, one holding mostly ground points $P_{gr}$ and the other mostly vegetation $P_{veg}$. This clustering step allows the undisturbed processing of ground and vegetation clouds separately and eliminates problems created by artifacts such as rocks or significant difference in elevation. The $P_{gr}$ is first processed to acquire a good estimate of the ground plane.

The points belonging to the ground plane are the majority of $P_{gr}$ and are easily detectable by a RANdom SAmple Consensus (RANSAC) designed to estimate the coefficients of a 3D plane. The core of the RANSAC algorithm for the estimation of the ground plane $P_{pl}$ utilizes the simple linear model:

$$ax+by+cz+d=0$$

$$n^T x = -d, \quad (4.3)$$

with $n=[a\ b\ c]^T$ and $x=[x\ y\ z]^T$, and solves for the normal n through the covariance matrix $C \in R^{3 \times 3}$ as computed by the set of plane inlier points $S \in R^3$:

$$C = \sum_{i=1:|S|} (s_i - \hat{s})(s_i - \hat{s})^T, \quad (4.4)$$

where $\hat{s} \in R^3$ is the mean of all $s_i \in S$.

The covariance matrix C captures the dispersion of the ground points and its three singular vectors that can be computed by its singular value decomposition (SVD), describe the three main directions of this dispersion. Since the plane is a flat surface, the normal n, which is perpendicular to the plane, indicates the direction with the least variance and is captured by the singular vector corresponding to the smallest singular value. After the acquisition of n, d is directly computed from Eq. 4.3 by substituting x with $\hat{s}$ which is a good representative for the points belonging to the plane.

At this stage, it is desirable to align the normal n of the ground plane with the normal of the x-y plane $k=[0\ 0\ 1]^T$. The solution is utilizing the Rodrigues' rotation formula, where the point cloud is rotated around an axis u=cross(n, k) perpendicular to both n and k by the angle between them $\theta$=angle(n, k):

$$R = I + \sin(\theta)[u]_x + (1-\cos(\theta))[u]_x^2, \quad (4.5)$$

where $I \in R^{3 \times 3}$ is the identity matrix and $[u]_x$ is the skew symmetric matrix form of the vector x. The rotation matrix $R \in SO(3)$ is acting on all the points in the point cloud P and the resulting point cloud is aligned perpendicularly to the z-axis. Finally, a mean of the $P_{pl}$ is computed and subtracted from all the points in P to move the ground plane on top of the x-y plane.

Attention is required by the sign of n so that the rotation is successfully orienting the point cloud. A test is performed as a last step by checking all the z values of the points and if the majority of them is found positive the solution is accepted, otherwise the process is repeated with n=-n.

4.2.3 Noise Filtering As in most real world data, the noise in the data was present with the form of uncertainty in the 3D measurements and 3D artifacts forming undesired artifacts (e.g. stones in the field). One step after the separation of the main point cloud P into $P_{gr}$ and $P_{veg}$, the second is treated with a custom filtering algorithm similar to DB SCAN that removes clusters of size less than a threshold n if they are located further away than a distance d from any other point cluster.

The details of this O(n log n) algorithm are seen in Algorithm 2 where a KDtree structure is selected for fast (O(log n)) neighboring points search, a boolean vector visited keeps track of the points that have been visited, and another boolean vector keepers stores the indices of the points that comply with the two aforementioned thresholds.

Figure 11:
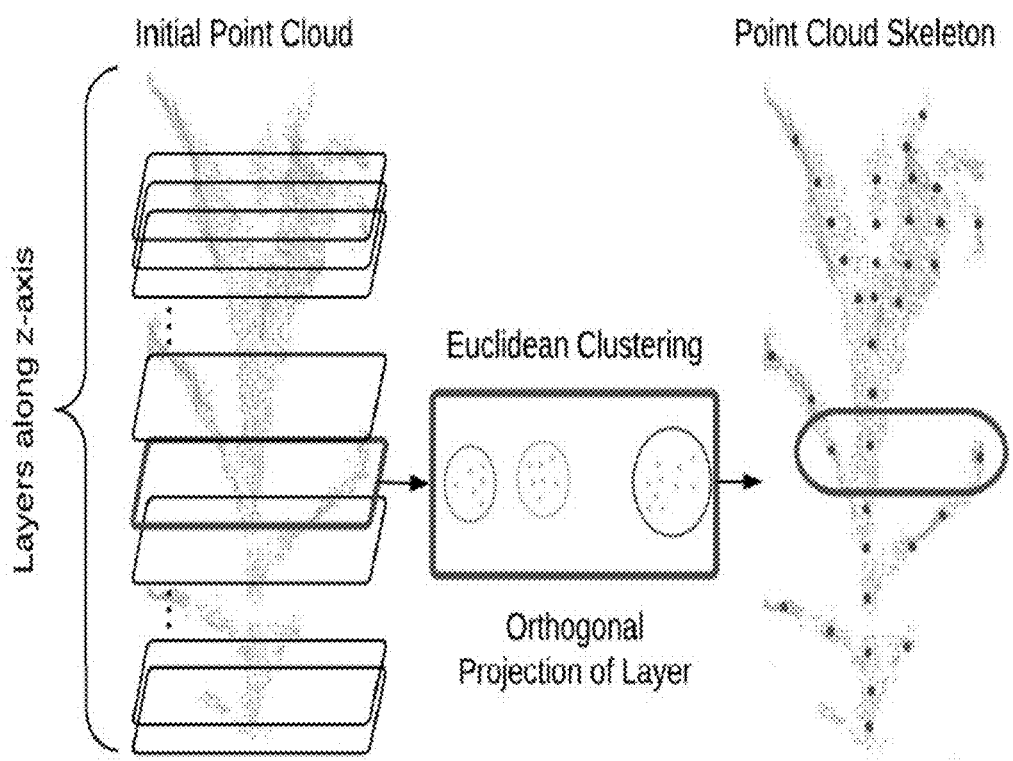
FIG. 11 is an example flow chart for an example thinning process of the 3D reconstruction of a single plant. The points are divided in layers based on their height and in each layer a Euclidean clustering algorithm performs a grouping. The centroid representatives of each group form the final thinned cloud.

4.2.4 Skeletonization The extracted 3D reconstructions usually have a few million points and the processing power required to treat those is quite high. In an effort to reduce the running-time and add robustness against noise, the $P_{veg}$ is undergoing a skeletonization step that thins out the excess points but retains the ones that express the basic topology of the plants FIG. 11.

Our custom skeletonization Algorithm 3 takes advantage of the alignment of the point cloud that was described in 4.2.2 and splits it into thin slices of height h along the z-axis. Each slice now contains k points of similar height z that are spread across the x-y plane and the goal is to perform a per-slice clustering to find points that best represent the rest. The clustering creates at least one cluster Cl at each slice and is performed utilizing a Euclidean Clustering technique (O(n log n)) described by Rusu and the only parameter needed is a radius r defining a sphere for the 3D space search. The complexity of this algorithm is mainly the Euclidean Clustering that is repeated k times, once for each slice, complemented by the computation of the cluster average to extract the representing point. This brings the total complexity to O(mk log k) with m being the number of clusters found in a slice. An important element of this algorithm is the ability to associate points with their representatives and this is achieved by an index vector associationIndex that stores the representative for each point.

Algorithm 2: Filtering algorithm for the removal of noisy points and artifacts.

```
   Result: ptsFiltered = set of points surviving the filtering
1  Initialization:
2  kdtree = createKDtree(P_veg)
3  N = |P_veg|
4  keepers = False(1 : N)
5  visited = False(1 : N)
6  Main Loop:
7  for i = 1 : N do
8  |    if visited(i) then
9  |    |    continue
10 |    end
11 |    pt = P_veg(i)
12 |    neighborsIndex = findNeighbors(kdtree, pt, d)
13 |    if |neighborsIndex| > n then
14 |    |    keepers(neighborsIndex) = True
15 |    |    visited(neighborsIndex) = True
16 |    end
17 |    visited(i) = True
18 end
19 ptsFiltered = P_veg(keepers)
```

Algorithm 3: Skeletonization algorithm for the
for the thinning of the vegetation point cloud.

```
    Result: skeleton = set of points forming the skeleton
    Result: associationIndex = vector storing the representative of each
            point
 1  Initialization:
 2  N = |P_veg|
 3  counter = 1
 4  low = minimumZ(P_veg)
 5  high = maximumZ(P_veg)
 6  slices = low : high
 7  associationIndex = zeros(1 : N)
 8  skeleton = ∅
 9  Main Loop:
10  for i = 1 : |slices| − 1 do
11   |      ptsIdx = ptsBetweenSlices(i, i + 1)
12   |      Cl = euclideanSegmentation(P_veg(ptsIdx), r)
13   |      for j = 1 : |Cl| do
14   |       |      centroid = average(Cl(j))
15   |       |      skeleton(counter) = centroid
16   |       |      associationIndex(ptsIdx(Cl(j))) = centroid
17   |       |      counter + +
18   |      end
19  end
```

4.3 Stem Segmentation

Point clouds that depict crop field scenes may benefit greatly from the previously presented transformation and preprocessing schemes. The updated $P_{veg}$ point cloud is now ready to be processed and the first step towards the final segmentation goal is the extraction of the stems. The plant stems impose complexities in the separation of leaves, while on the other hand reveal helpful information regarding the position of leaves. Therefore, their detection may be both necessary and desirable. First, an original algorithm that takes advantage of the geometry of the corn plants is presented, followed its application in the detection and extraction of the plant stems.

4.3.1 Randomly Intercepted Nodes The corn stems are mostly perpendicular to the ground but this is not always the case, especially when accounting for the amount of noise in the 3D reconstructions, the slope differences in the fields, and the occasional but quite frequent double-planting (the seeding tractor planted more than one seeds in the same location). Consecutively, any solutions that make this assumption are doomed to fail in at least one of the aforementioned cases and cannot be employed for a generalized solution.

An observation regarding the topology of the plants that always holds however, dictates that a rain drop that falls on any part of the plant has to glide on top of the plant's surface before it reaches the ground and has only two routes to achieve that; fall over the edge of a leaf, or follow the stem closely until it reaches the plant base. The core of our algorithmic approach makes use of this observation and tries to simulate the behavior of hundreds of randomly placed rain drops, were they to glide on the surface of the point cloud $P_{veg}$. The associated algorithm is called RAndomly Intercepted Nodes (RAIN) and records common routes of the randomly placed rain drops.

The RAIN is heavily utilized for the extraction of several of the proposed biometrics. By changing the thresholds, altering the conditions, and even applying it iteratively, different plant topologies are captured rendering it an inseparable tool of this pipeline. In the following paragraphs we will follow the algorithm provided in Algorithm 4 and explain its basic steps.

Algorithm 4: The RAIN algorithm is core
for the extraction of several biometrics.

```
    Result: P_labels = vector with the labels of each visited point
 1  Initialization:
 2  P_veg − input point cloud
 3  kdtree = createKDtree(P_veg)
 4  counter = 1
 5  label = 0
 6  Main Loop:
 7  while counter < N_drops do
 8   |   ptIndex = randomlySelectPoint(P_veg)
 9   |   pt = P_veg(Index)
10   |   if pt.z < th_height then
11   |    |   continue
12   |   end
13   |   label + +
14   |   Line = ptIndex
15   |   reachedEnd = False
16   |   while !reachedEnd do
17   |    |   neighborsIndex = findNeighbors(kdtree, pt, th_neigh)
18   |    |   [d, select] = max(pt.z − P_veg(neighborsIndex).z)
19   |    |   if P_labels(neighborsIndex(select))! = 0 then
20   |    |    |   P_labels(Line) = P_labels(neighborsIndex(select))
21   |    |    |   Line = ∅
22   |    |    |   label − −
23   |    |    |   reachedEnd = True
24   |    |   else if d > 0 then
25   |    |    |   pt = P_veg(neighborsIndex(select))
26   |    |    |   Line = Line ∪ neighborsIndex(select)
27   |    |   else if size(Line) >= minPathSize then
28   |    |    |   P_labels(Line) = label
29   |    |    |   reachedEnd = True
30   |    |   else
31   |    |    |   Line = ∅
32   |    |    |   reachedEnd = True
33   |    |    |   label − −
34   |    |    |   counter − −
35   |    |   end
36   |   end
37   |   counter + +
38  end
```

The algorithm's name is a metaphor of a physical phenomenon, therefore when mentioning "rain drops" it means randomly selected points within the point cloud. The routes of these drops while moving from point to point are simply sets of the indices of the visited points and the selection of each next point in the path is subject to a few simple rules influenced by gravity. The goal is to populate a vector $P_{labels}$ associated with each one of the cloud points with values that depict the label of each point. At the end, the points with the same label in the $P_{labels}$ will belong to the same topology (stem, plant, leaf, etc.) and the points that were not visited by the algorithm (label=0) and can be discarded.

Initially, the number of randomly generated rain drops $N_{drops}$ is selected. In an example 3D reconstruction the algorithm may need to identify as many as forty plants and one thousand $N_{drops}$ are sufficient. It makes sense for the drops to start at the higher levels of the reconstruction to cover more ground and capture a larger portion of each plant, so any point generated lower than $th_{height}$ is discarded and this random pick does not count towards the total $N_{drops}$ (lines 10-12). A random drop pt with the proper starting height will be generated (line 8) and added as the first entry in a vector Line that stores all the visited points in the current path (line 14). The boolean variable reachedEnd (line 15) determines when the current path terminates and is set true when the current path reaches an already visited path or the algorithm cannot find a neighbor that is lower than the current point.

Using the newly generated drop and the precomputed kdtree, all the neighbors within a sphere with radius $th_{neigh}$ are found (line 17) and their height (z) is compared against the current point pt. The neighbor which is further below the pt is selected (select) as the next point of the path (line 18). This step can be enhanced with the computation of a derivative along the z-axis but is not necessary for the basic case. For the case of an original path that has not been visited before, the algorithm shall check if the next point is actually lower than the current point (line 24), will make the next point current (line 25), will add the next point's index in the Line vector, and will repeat the process from the while loop (line 16).

If the next point belongs to a path that has been visited before (line 19), all the previously stored points of the path will be combined with the old path bearing the same label, the label will discard this path (line 22), and the Line and reachedEnd will reset. In case the current point pt is the last of its path (line 27), the algorithm will verify that the path has at least minPathSize points and will generate a new path with a new label (line 28). In any other case, an invalid path has reached (line 30), the path variables will reset (lines 31-34) and the algorithm will start again on line 7.

The RAIN is very efficient since out of all the randomly generated drops Ndrops, the number of original routes $N_{original}$ that need to complete the whole algorithm tend to match the number of plants $N_{plants}$ in the reconstruction ($N_{drops} \rightarrow N_{original} \cong N_{plants}$). Most of the random drops encounter an already visited point and terminate prematurely and, given the downward exploratory movement of the drops, the number of points that are actually considered as potential path candidates are severely reduced. Therefore, the complexity of the algorithm is almost linear to the number of plants multiplied by the points in each path m and by the complexity of the kdtree search ($\mathcal{O}(\log n)$, n is the size of $P_{veg}$); ($\mathcal{O}(N_{plants}\, m \log n)$).

Figure 12:
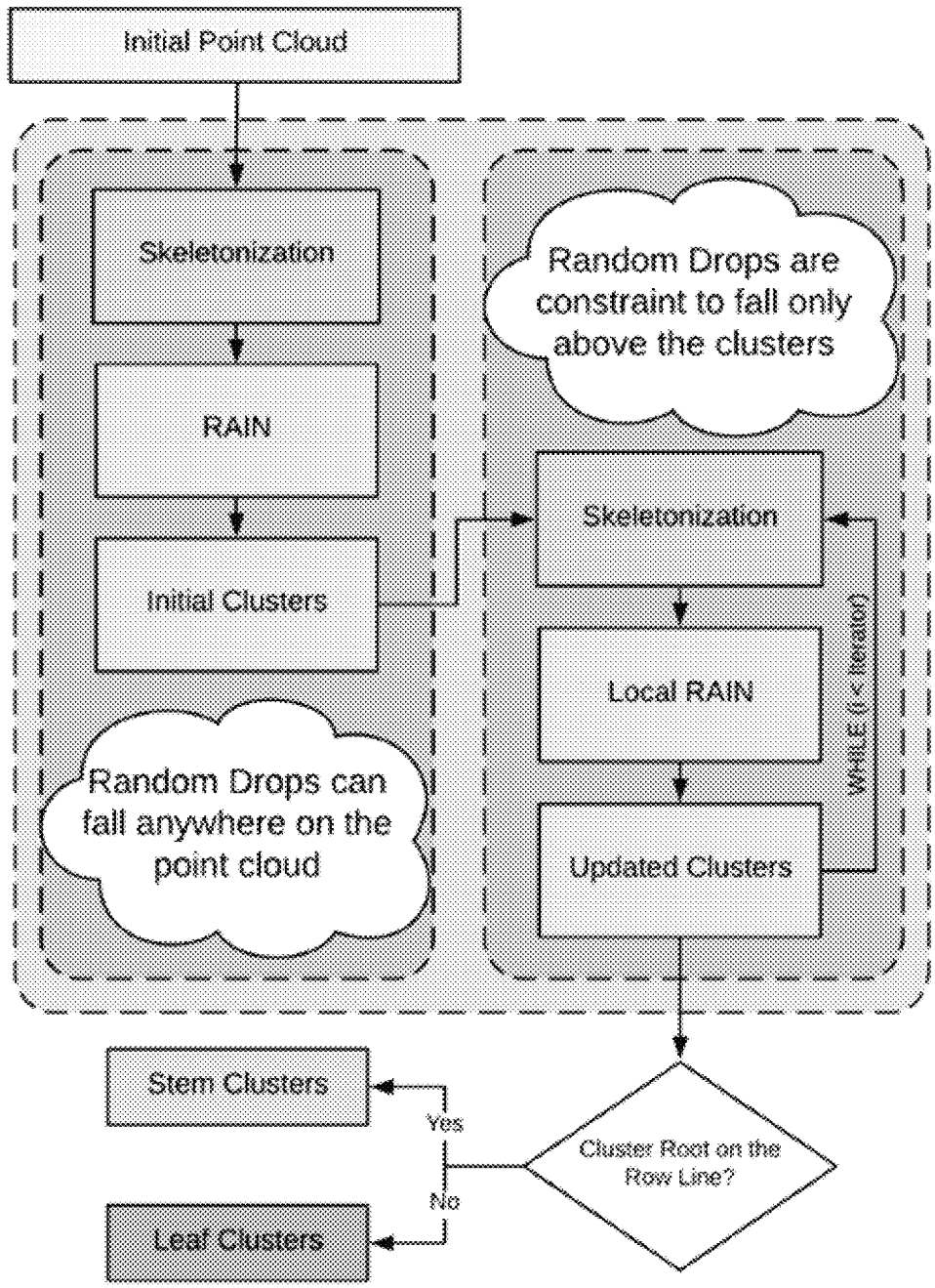
FIG. 12 is a flow chart of an example algorithm for the detection of the plant stems. The initial point cloud is treated to provide initial clusters that potentially hold the stems and then an iterative process removes the non-stem points until the clusters represent either a stem or the part of a leaf. The prior knowledge of all the stems belonging on a row is utilized to throw away the leaf clusters.

4.3.2 Stem Detection The skeletonization and RAIN algorithms described in Secs. 4.2.4 and 4.3.1 were called forth and set inside a loop to iteratively act on the $P_{veg}$. The idea is that each iteration will be performed on a progressively pruned version of $P_{veg}$ until only the stems survive. The pruning of the point cloud is inspired from the physical interpretation of RAIN and can be thought as localized raining; each plant has a "private cloud" whose rain drops are falling based on a Gaussian distribution with mean right above the plant and a very narrow standard deviation. The details of the algorithm can be seen in FIG. 12.

Figure 13:
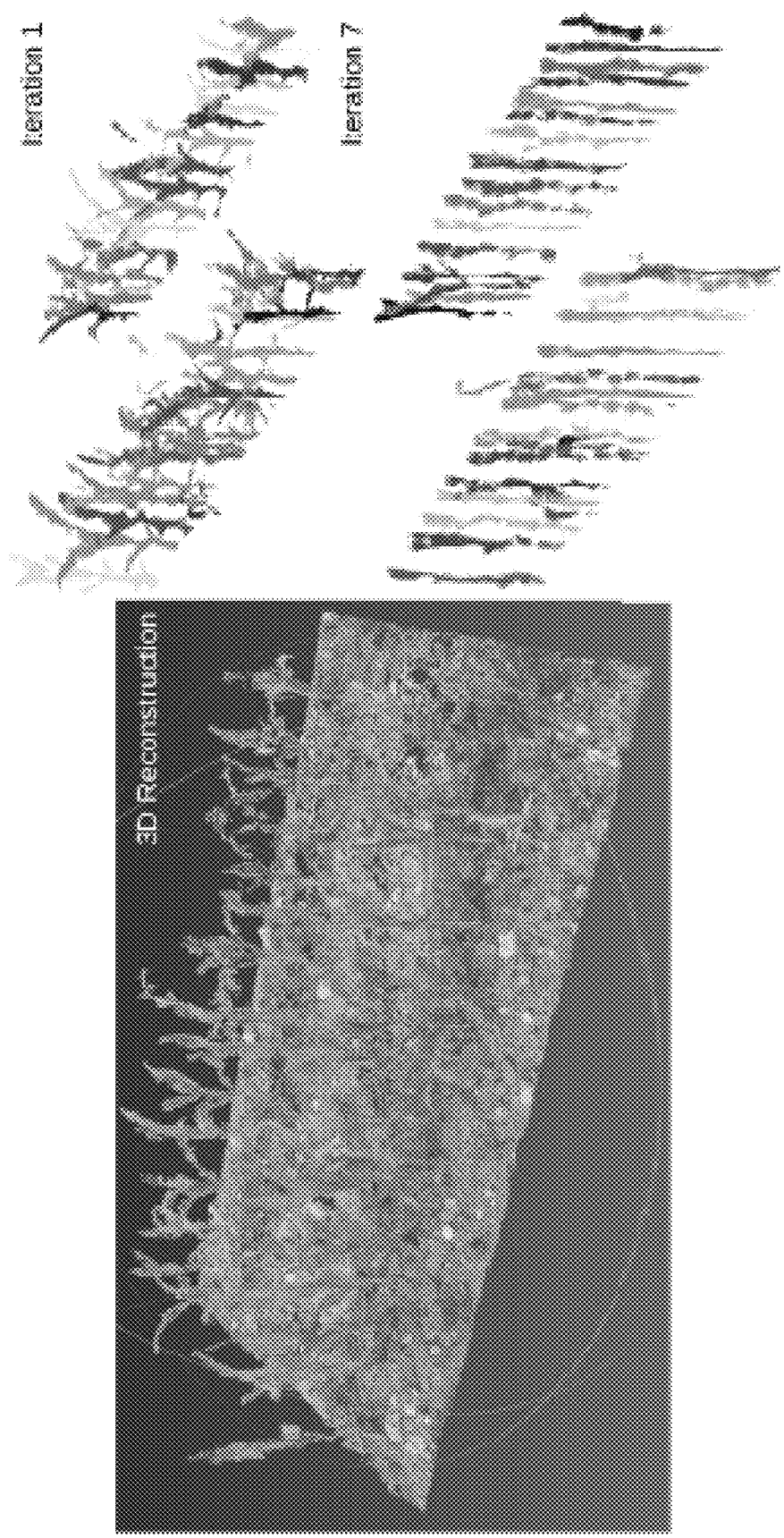
FIG. 13 is example images of the results of the iterative algorithm for the detection of stems. The original point cloud is provided on the left for comparison. The first application of the generalized skeletonization and RAIN algorithms produces clusters with stems and leaves mixed (top right), while after the 7th iteration, only the stems are left along with some clusters that represent leaves.
Figure 14:
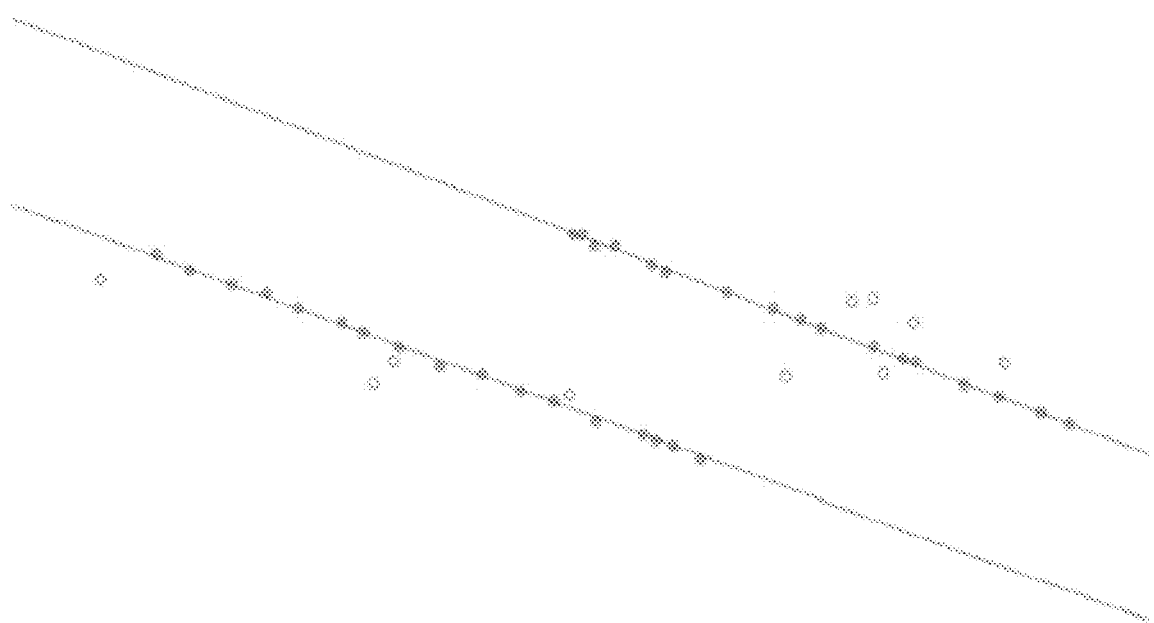
FIG. 14 is an image showing an example the demonstrates the fitting of lines in a collection of points that were created as the projections of the lowest points of the generated clusters. The line fitting RANSAC algorithm finds the two lines and then terminates since the number of the remaining points and the fitting score are not satisfactory.

The initial point cloud is treated once by the general skeletonization and RAIN algorithms to produce some initial clusters of points that may include the actual stems. The same process is then applied per cluster with the random selection of initial path points is constrained above the cluster instead of the whole point cloud. As seen in FIG. 13, a few iterations later, the stem point clusters have been exposed but with them there is a chance of capturing clusters of leaves. The filtering of the true stems is achieved by the detection of the corn rows and the prior knowledge that all stems need to be on a row; if a cluster of points does not belong on a cluster, it is discarded.

For the row detection, the lowest point of each cluster is detected and projected on the x-y plane. In case the stem is comprised by two or mode clusters, it was assumed that the projections of all these lowest points will be very close to the row line. The projection of the lowest points of all the clusters on the x-y plane and the two lines that represent the two rows can be seen in the FIG. 13. The detection of the row lines treats these projections as 2D points on a plane and uses RANSAC to fit lines iteratively. Every time a line is found successfully, its points are removed from the search space of the algorithm until there are very few points left, or the fitting score is not acceptable. Similar to the process used for the detection of the ground plane, RANSAC may be ideal for applications with noise and uncertainty; the idea of trial and error has brought substantial results both in the case of RANSAC and RAIN.

Once the points of the stems have been found, they are immediately removed from the $P_{veg}$ leaving behind points that belong to leaves. A filtering step similar to the one described in Sec. 4.2.3 cleans the leaves from any noisy or leftover stem points and the resulting point cloud is fed to the leaf segmentation algorithm described in the next section.

4.3.3 Limitations In some instances, the density of the canopy or the difference in growth between two neighboring plants may result in one plant being overshadowed. Using the proposed algorithm, if one plant is missed during one of the iterations then it cannot be recovered. This is a limitation that can be addressed by setting hard thresholds on the height $th_{height}$ of the initialization of rain drops. This step may produce more refined results but is not generalizable and each reconstruction might need different thresholds depending on the plant growth, or the slope of the ground. The example in FIG. 13 depicts two rows of corn of the same growth stage but one row was treated with less N resulting in lower biomass. This would affect the threshold selection negatively.

A most common problem encountered in algorithms that are based on random initialization is the repeatability of the results. In the RAIN algorithm, this problem is manifested through the differences in the paths that are generated when the algorithm executes multiple times. Although the number of segmented plants is the same and the main shape of the stems is captured, the paths of the "rain drops" that generate these segments will be slightly different every time, thus having issues with small plant parts that one time will be part of the stem, while another time part of a leaf. The advantage of the randomization that allows for such elegance in the RAIN algorithm, at the same time may be its greatest limitation.

Partially reconstructed plants provide poor results, especially the ones at the borders of the reconstruction. This creates an issue on how to select the best part of the reconstruction in order to retrieve consistent and satisfactory results. This problem can be partially addressed by the row detection methodology by informing the user which rows have the best fit. The RANSAC is going to select first the line that satisfies the points giving an indication of which row has the most and better reconstructed plants.

Figure 15:
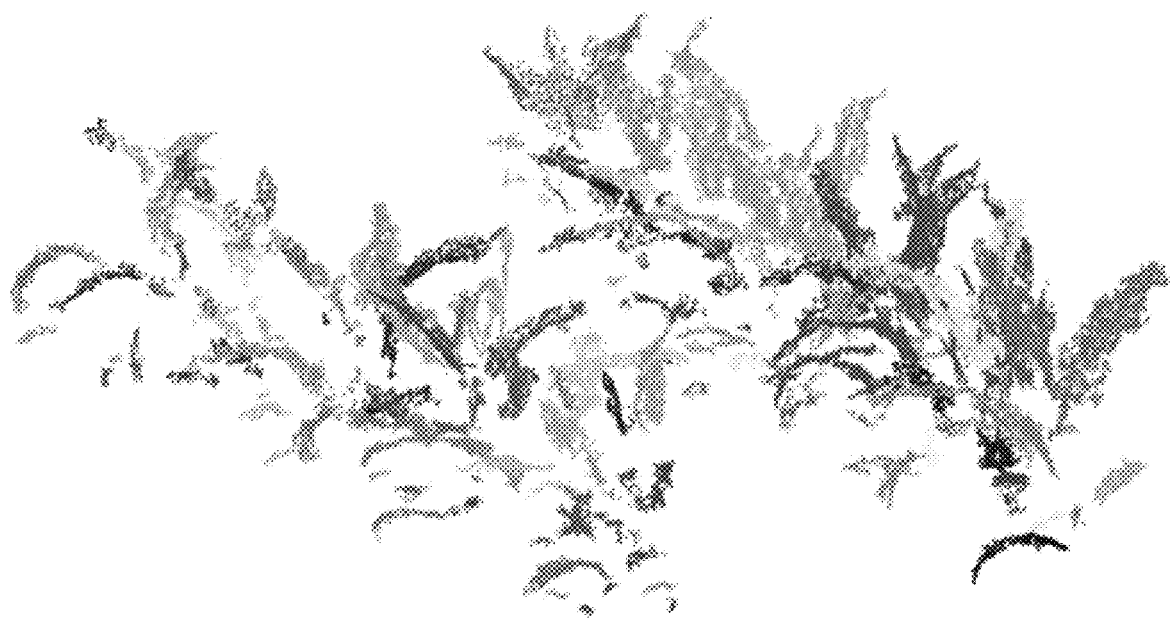
FIG. 15 is an image depicting only leaves of depicted plants with the ground and parts of the stems of the plants removed. After the removal of the ground and stems using the aforementioned iterative algorithm, only clusters of leaves are left. The leaf clusters have gone through a Euclidean clustering step that creates groups of at least one leaf.

4.4 Leaf Segmentation Till this point, the segmentation pipeline has managed to remove the ground and parts of the stems of the plants and the leaves of the depicted plants are the only points left, as seen in the example FIG. 15. For the growth stage of the plants we are interested in ("V3" to "V8"), the canopy is not particularly dense and most of the individual leaves are observable during the 3D reconstruction.

Figure 16A:
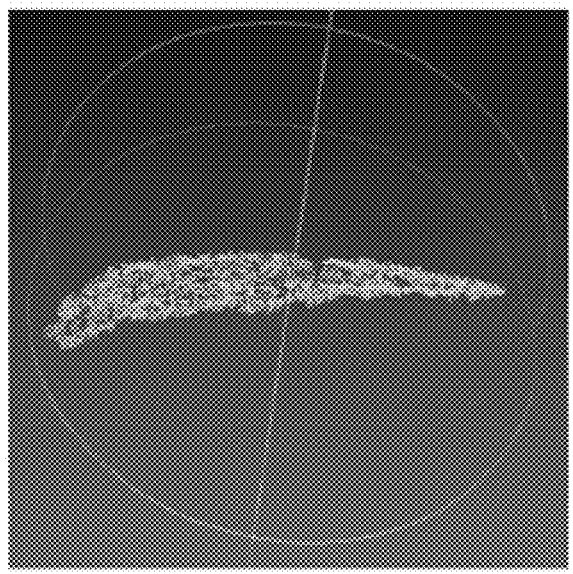
FIGS. 16A-16D are images showing examples of clusters produced by the initial Euclidean clustering step. Examples like FIG. 16A do not need extra refinement since the initial cluster represents a single leaf. Examples like FIGS. 16B-16D may need to be further refined to produce single leaf clusters.
Figure 16B:
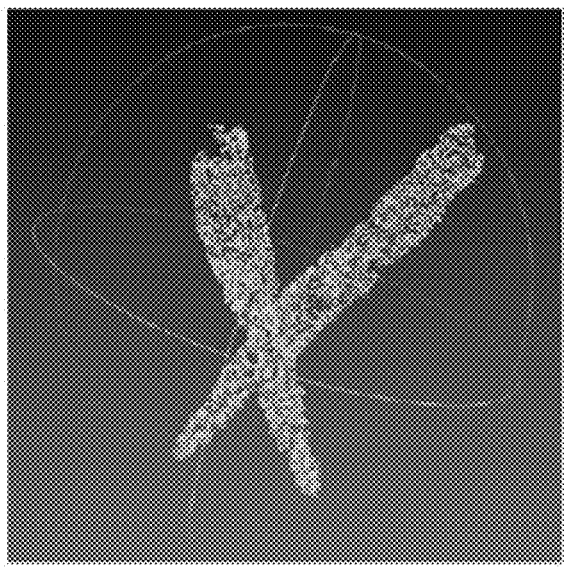
Figure 16C:
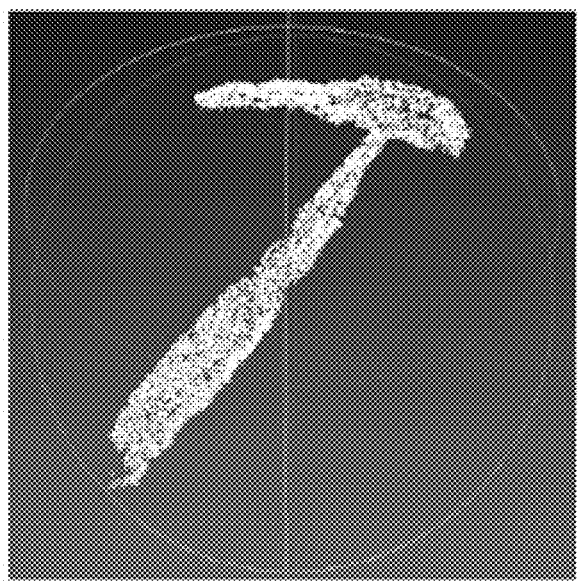
Figure 16D:
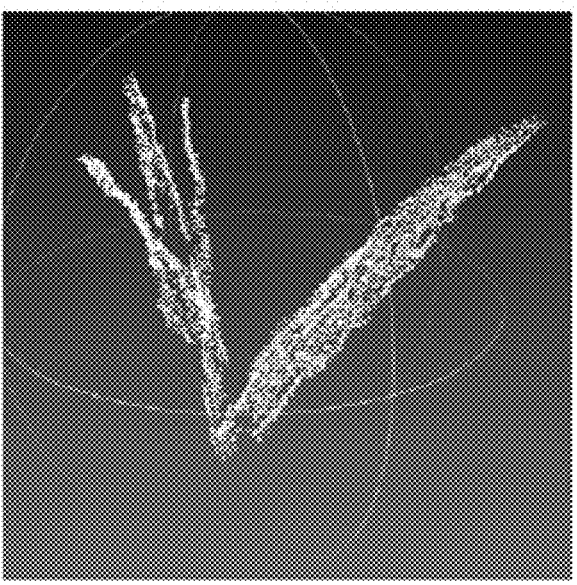

Still, occlusions and leaf intersections are present leading to a non-trivial segmentation process which concludes in two steps. Initially, a clustering technique such as the Euclidean cluster extraction combined with a statistical outlier removal is employed to break down the point cloud P into N clusters of 3D points $P_i \subset P$ with i=1, ..., N, each containing one or more single leaves, with examples seen in FIGS. 16A-16D. FIG. 16A is an example of a single leaf cluster. FIG. 16B is an example of two intersecting leaves in the same initial cluster. FIG. 16C is an example of two touching leaves in the same initial cluster. FIG. 16D is an example of four leaves at the top of a single plant in the same initial cluster.

The second step of the segmentation needs to iterate over all N clusters, leave the single leaf clusters intact, and break apart the clusters that contain more than one leaf. For this purpose, a 3D skeletonization technique is employed which acts on each point cluster $P_i$ and delivers a skeleton $S_i$ comprised from a set of connected nodes $s \subset S_i$. Each node is the centroid of a collection of neighboring 3D points and acts as their representative.

The nodes capture the topology of the leaves, which is used by the proposed algorithm to achieve a refined segmentation. In particular, only three types of nodes s are assumed; namely the endpoint nodes, the intersection nodes, and the standard nodes. Endpoints are nodes with only one immediate neighbor, while intersections have more than two immediate neighbors and standard points have exactly two.

Under this definition, it is assumed that any endpoint node signifies one end of a single leaf and that starting from an endpoint, a set of neighboring standard and intersection nodes in a smooth trajectory forms the midrib of the leaf. Referring to FIG. 17A, one can see the nodes $s_1, \ldots, s_{10}$ and $s_{11}, \ldots, s_{17}$ forming the two leaf midribs while both curves start from an endpoint. Although we assume the midribs to start from an endpoint, it is possible for them to end at any node and the decision is based on the smoothness of the curve.

In order to define a criterion for the smoothness of a curve, we treat the nodes of the skeleton are treated as measurements of the trajectory of a physical object in 3D and a Kalman filter is employed to decide whether a node belongs to the midrib or not. This segmentation refinement process referred to as Skeleton Kalman Filtering (SKF). Specifically, the following model is employed:

$$x_k = x_{k-1} + v_{k-1}\Delta t + \tfrac{1}{2}\alpha \Delta t^2$$

$$v_k = v_{k-1} + \alpha \Delta t \tag{4.6}$$

which is transformed, as used in Kalman filtering, in the matrix form:

$$\begin{pmatrix} x_k \\ v_k \end{pmatrix} = \begin{pmatrix} I_3 & I_3 \Delta t \\ 0_3 & I_3 \end{pmatrix} x_{k-1} + \begin{pmatrix} \frac{\Delta t^2}{2} \\ \Delta t \end{pmatrix} \alpha \tag{4.7}$$

with $x_k = [x,y,z]^T$, $v_k = [\dot{x}\dot{y}\dot{z}]^T$, $\Delta t = 1$, $\alpha = 0.01$, $I_3 \in \mathbb{R}^{3\times 3}$ identity matrix, and $0_3 \in \mathbb{R}^{3\times 3}$ zero matrix. At the same time, the measurements $z_k = [z_{k_x}, z_{k_y}, Z_{k_z}]^T$ take the form:

$$z_k = (I_2|0_3)x_{k-1}, \tag{4.8}$$

and the model and measurement uncertainty matrices Q and R respectively are:

$$Q = \begin{pmatrix} I_3 \frac{\Delta t^4}{4} & I_3 \frac{\Delta t^3}{2} \\ I_3 \frac{\Delta t^3}{2} & I_3 \Delta t^2 \end{pmatrix}, R = (I_3 \sigma^2), \tag{4.9}$$

with $\sigma = 0.1$.

The position part $x_k$ of the state vector is initialized with the first endpoint of the midrib, velocity $v_k = [0,0,0]^T$ and the Kalman filter is applied iteratively. At each iteration the estimated position $x_{k_{est}}$ is compared with the next neighboring node(s) (that act as measurements $z_k$) and based on a distance threshold the node is considered part or the end of the midrib.

$$\|x_{k_{est}} - z_k\|_2 < d_{threshold}. \tag{4.10}$$

Figure 17B:
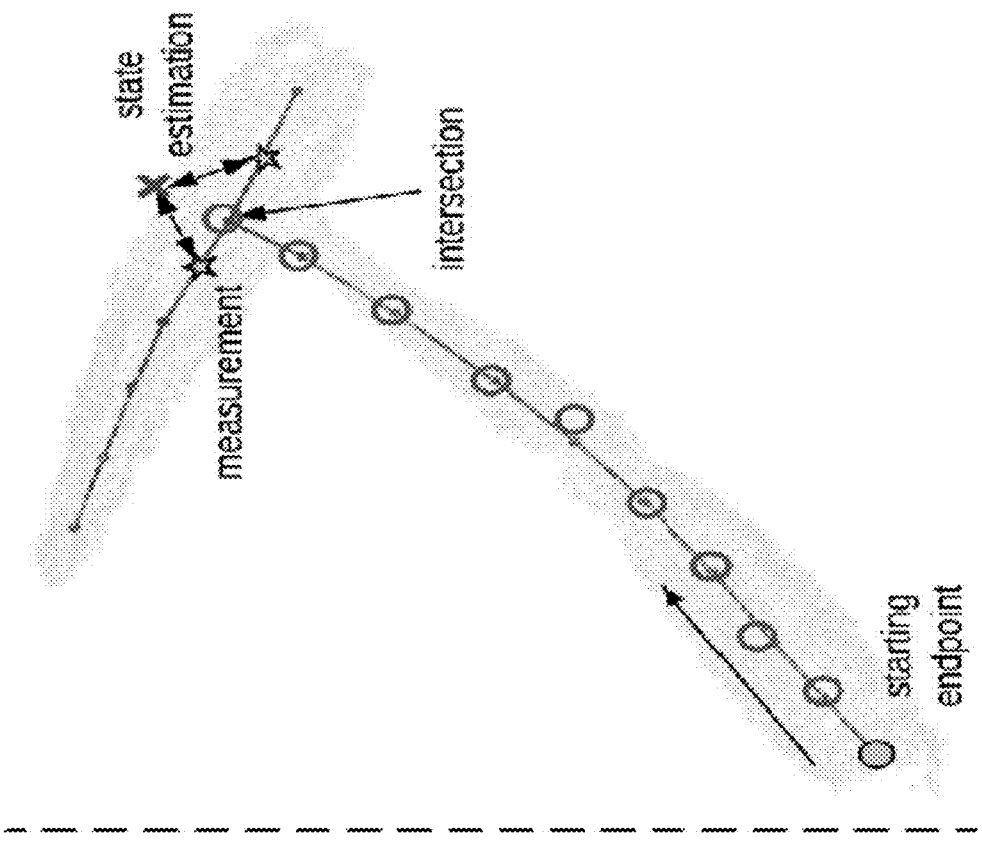
FIG. 17B is an example of the SKF algorithm starting from node $s_1$. Kalman filtering is used iteratively to make decisions on the nodes that belong to the midrib. The circles represent estimates on the position of the nodes $xk_{est}$ that have been found to be close to their respective node-measurements (shown as dots along the lines). The cross presents the position estimate that is far away from its respective measurements (stars), thus signifying that $s_{10}$ is an end-node for the particular leaf.
Figure 17A:
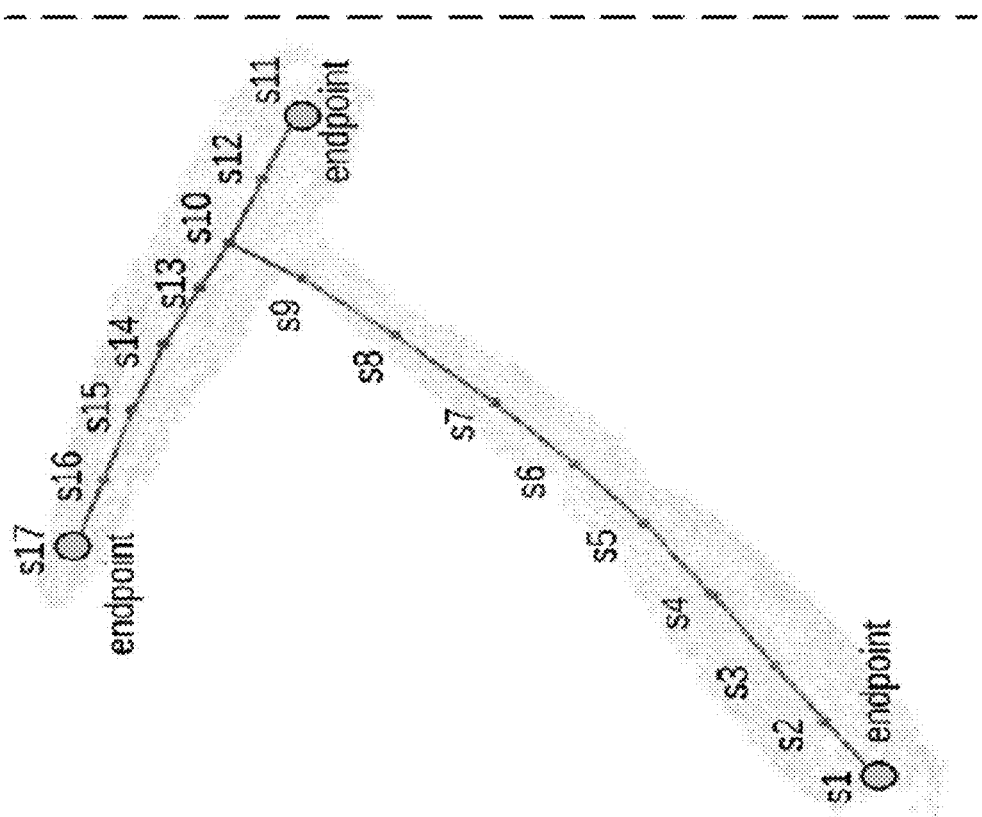
FIG. 17A is an image showing an example of a 3D skeleton of two overlapping leaves. Three endpoint nodes ($s_1$, $s_{11}$, and $s_{17}$), one intersection node ($s_{10}$), and several standard nodes ($s_2$-$s_9$, $s_{12}$, and $s_{13}$-$s_{16}$) are visible.

As seen in FIG. 17B, the skeleton branch that initiates from the starting endpoint $s_1$ applies Kalman filtering and adds the standard points up to $s_{10}$ to the midrib. The filter estimates that the next node $s_{11}$ should be at the "cross" for the smoothness of the midrib to persist. Nevertheless, the actual neighboring nodes (stars) are not consistent with the estimate meaning that the intersection node $s_{10}$ signifies the end of the leaf.

4.4.1 Limitations The proposed methodology may depend heavily on the quality of the 3D reconstruction for the segmentation of individual leaves. Especially in later growth stages, the density of the canopy occludes heavily the lower leaves resulting in their partial reconstruction. This in turn affects significantly the number of leaves that are estimated and therefore poses problems later in the extraction of biometrics.

A partial 3D reconstruction also affects the SKF segmentation step which utilizes the 3D skeletonization to separate the independent leaves. When the leaf surface has a large hole due to lack of texture in the reconstruction process, the skeleton is forced to create unnecessary branches which may end up in the over-segmentation of the leaf. This problem is partially addressed by the flexibility of the SOM and the summation of all the final leaf areas, nevertheless, it introduces inaccuracies to the final area computation.

4.5 3D Datasets

The several developed algorithms were executed on both artificial and real corn plants. Due to the complexity of the problem, the reproducibility of the experiments, and the accuracy in the collection of the ground truth measurements it was decided to validate the numerical correctness of some complex biometrics on artificial corn stalks, while the real corn reconstructions were limited in the span of "V3" and "V7" growth stages. Dense canopies with heavy occlusions in the lower leaves were dismissed as not applicable to the developed algorithms.

4.5.1 Artificial Corn Data A total of six artificial plants with similar biometrics were used that are based on real corn models at a "V6" growth stage. The basic biometrics (height, leaf length, inter-nodal distance) were measured directly. The areas of their leaves were approximated by the formula: L*W*k, with L the length of the leaf from the stem to the tip, W the maximum width, and the constant k=0.75 was selected based on literature as a viable approximation of the leaf area.

Figure 24A:
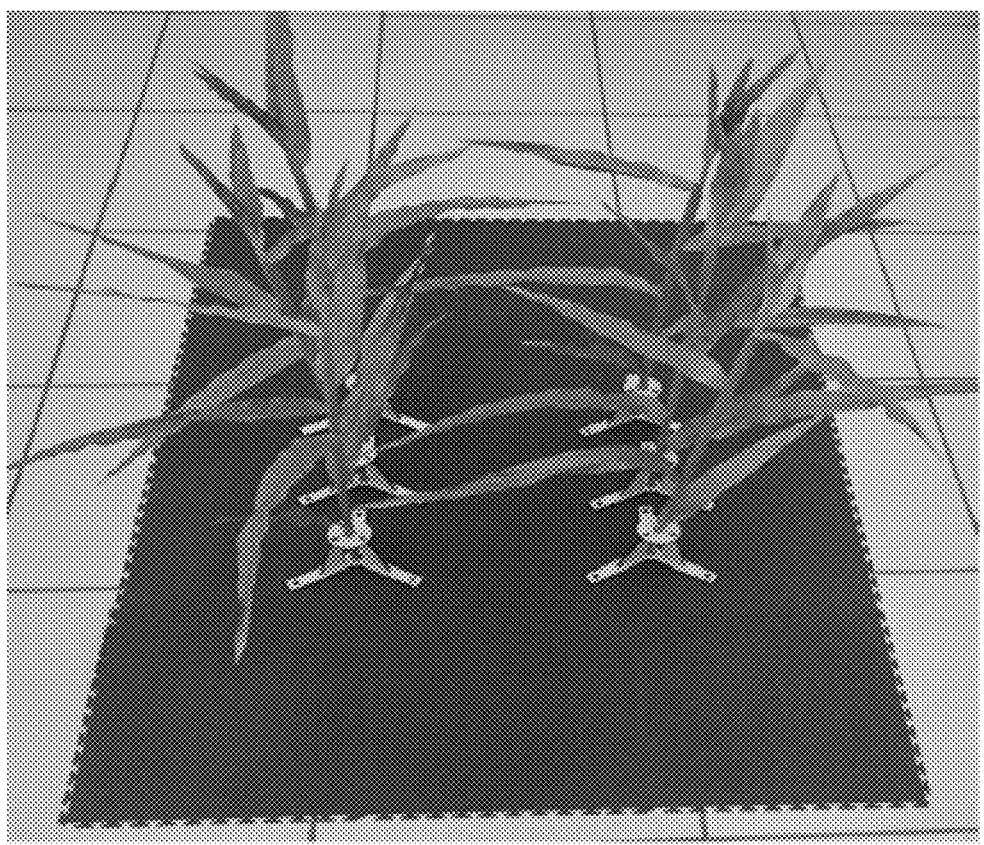
FIGS. 24A-24D are images showing steps for the point cloud preprocessing.
Figure 24B:
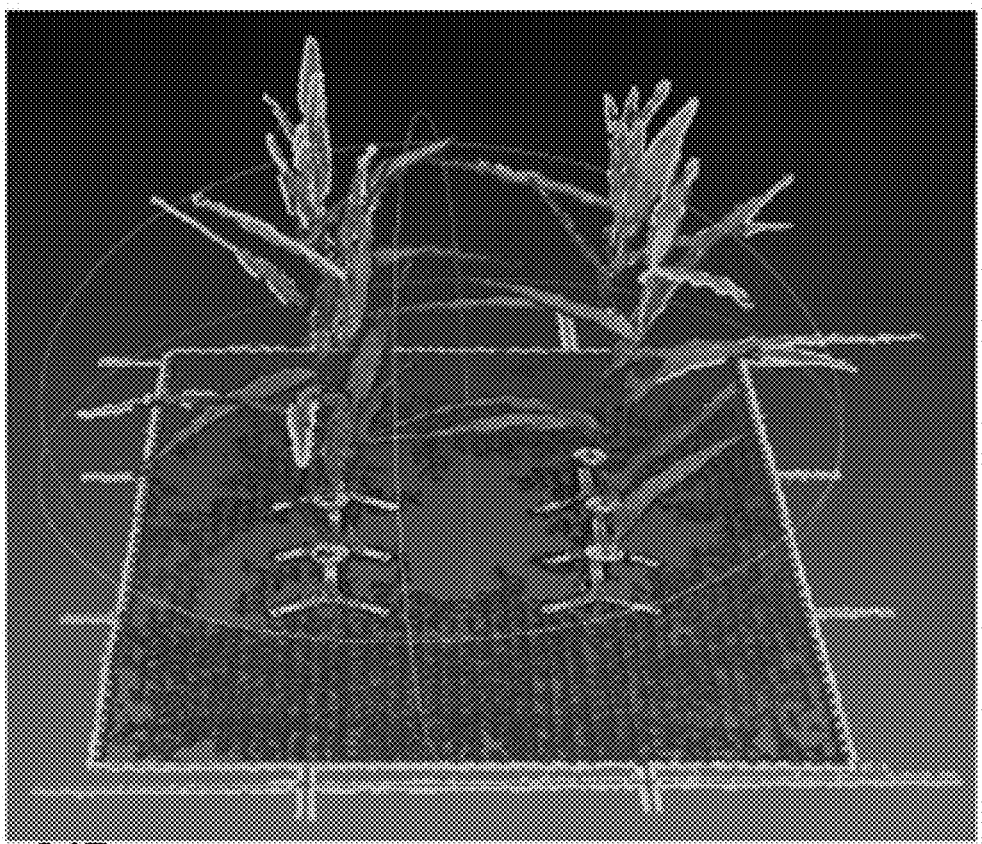
Figure 24C:
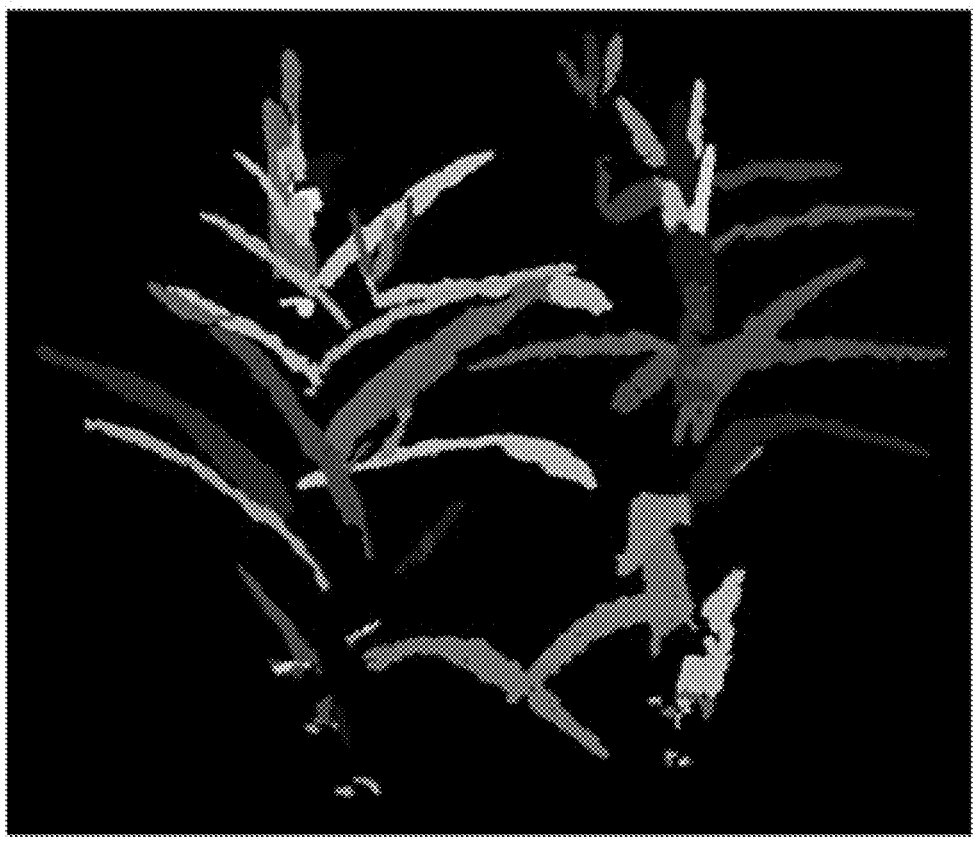
Figure 24D:
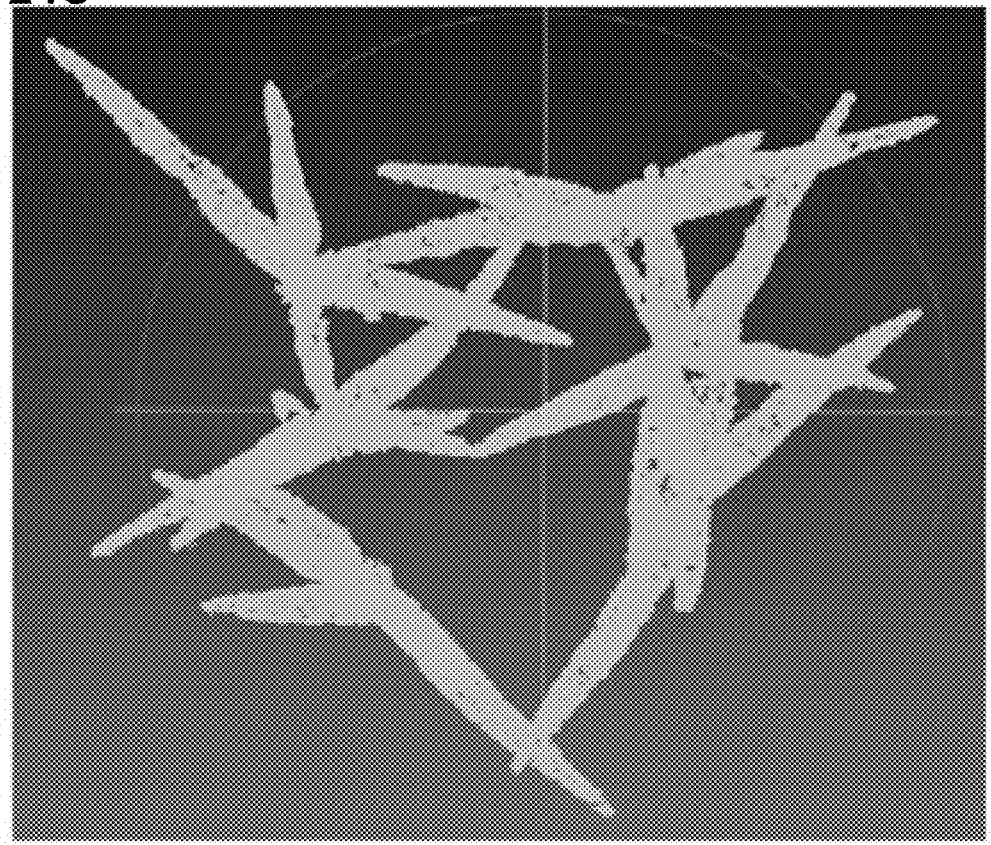

The 3D reconstructions were created offline using the VisualSFM toolbox with the number of input images varying from 18 to 24 and the images were collected with a handheld Olympus TG-4 camera of 1440×1920 pixel resolution. A sample sparse reconstruction output from the VisualSFM toolbox can be seen in FIG. 9, while dense reconstruction results produced via the use of the PMVS tool are seen in the FIG. 24B.

Figure 19:
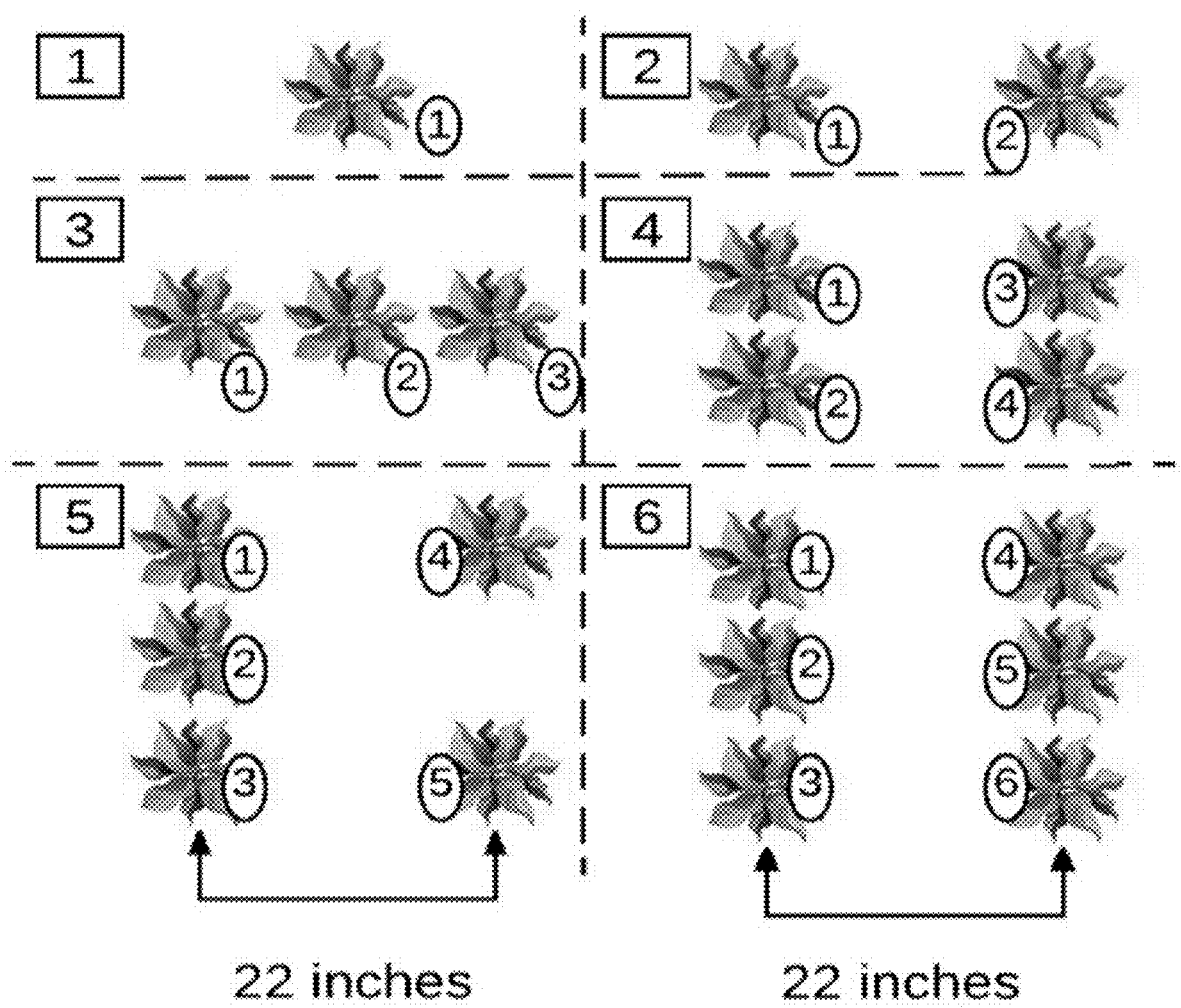
FIG. 19 is a conceptual diagram of the experimental setup involved six different corn plant configurations with increasing complexity. The numbers inside the squares depict the experiment number and the numbers in the circles represent the plant identification. One to six plants were used in realistic scenarios keeping distances between rows at 22 inches, an example standard corn row distance used at the United States farmlands.

Six different configurations of artificial corn stalks were considered with increasing complexity which, as seen in FIG. 19 representing experiments #1-#6, try to mimic realistic scenarios and assist in verifying the sensibility of the proposed method. In experiment #1a single plant is reconstructed showing how the algorithm behaves with minimal occlusion. The same goes for experiment #2 where non-overlapping leaves are considered in a standard 22 inch distance between two corn rows. Experiments #3 through #6 show cases of severe overlap and occlusion with increasing number of plants and #5 shows a case where the row is missing a plant due to seeding error.

Figures 18A, 18B:
FIG. 18A is an example of one of the images used for the construction of the 3D model visible on the right.
FIG. 18B is an image of the dense 3D reconstruction of real corn plants in the field is provided as reference for visual comparison with the artificial corn.

4.5.2 Real Corn Data Fifteen video sequences from four different field locations in Minnesota (Becker, Waseca, St. Paul, and Rosemount 3.6) were collected, with corn stages ranging from "V3" to "V7" and row distances either 22 or 30 inches. The sequences were collected by a DJI Matrice 100 UAV with a DJI Z3 camera and span 30 seconds each. The 3D reconstructions were created offline using again the VisualSFM toolbox with the input images retrieved as frames from the video sequences. Between 80 and 120 images of 3840×2160 pixel resolution were used to create each reconstruction. Image samples and their 3D reconstructions can be seen in FIGS. 18A and 18B. FIG. 18A is one of the images used for the construction of the 3D model visible on the right. FIG. 18B is an image of the dense 3D reconstruction of real corn plants in the field, which is provided as a reference for visual comparison with the artificial corn.

Section 5—Biometrics Extraction

The processing of the 3D point cloud as described previously in Section 4 was the step that generated the building blocks which will be used in this Section to estimate the various plant biometrics. The selected biometrics are examples of some commonly measured variables that are useful to both farmers and researchers alike.

The next few portions present the methodologies for the estimation of (i) the leaf area index, (ii) the individual plant height, (iii) the geodesic leaf length, and (iv) the leaf count for a single plant. The last is directly related to the geometry between leaves and the stem and can be used to also compute (v) the leaf angle with respect to the plant's stem, and (vi) the inter-nodal distance for a single plant.

5.1 Biometrics—Leaf Area Index

In agriculture literature, a common measure that indicates the biomass of the plant is the Leaf Area Index (LAI). This dimensionless quantity is defined as the one-sided green leaf area per unit ground surface area. This rather generic definition has received several practical definitions depending on the plant species, the leaf shape and the particular application.

Figure 20:
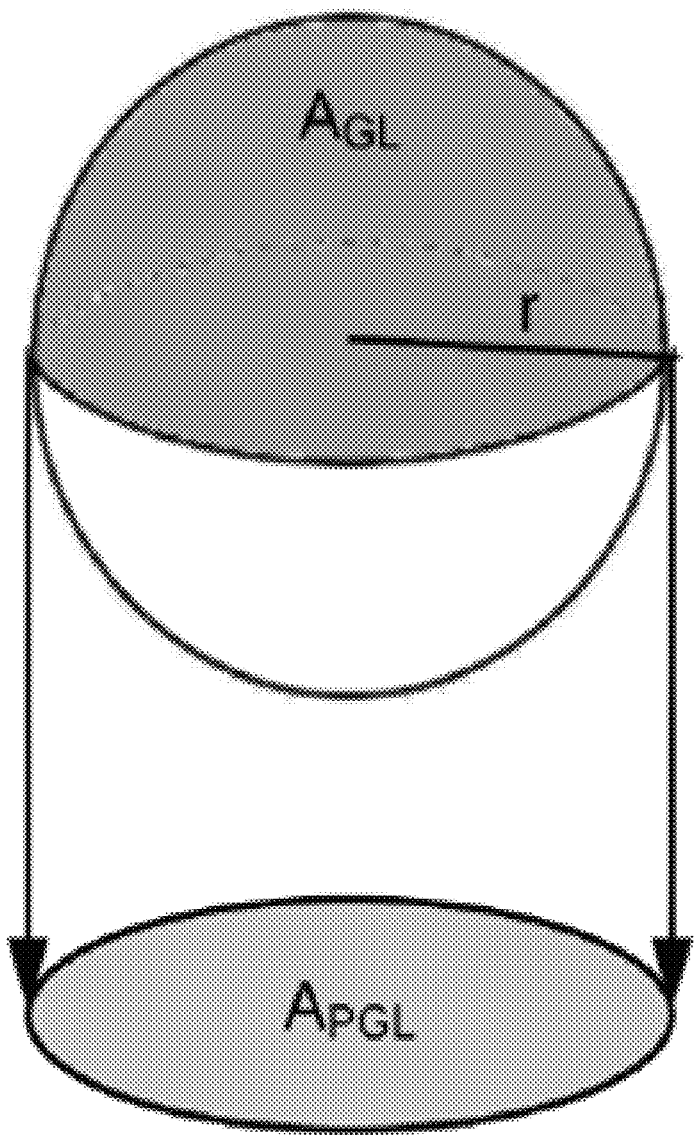
FIG. 20 illustrates a simple example to explain the definition of Leaf Area Index (LAI). The total area of the green part of the sphere symbolizes the area of the green leaves and is $2\pi r^2$ (r is the radius), while the orthogonally projected area is a circle of area $\pi r^2$. Therefore, LAI=$2\pi r^2/\pi r^2$=2.

FIG. 20 is an illustration of a simple example to explain the definition of LAI. The total area of the green part of the sphere symbolizes the area of the green leaves and is $2\pi r^2$ (r is the radius), while the orthogonally projected area is a circle of area $\pi r^2$. Therefore, $LAI=2\pi r^2/\pi r^2=2$.

For broadleaf plants such as corn, LAI can be computed either directly by destructive sampling of canopy leaves, or indirectly by approximate techniques that involve 2D imaging and solar radiation measurements above and below the canopy. Direct methodologies produce accurate results but are time consuming and destroy the plants. On the other hand, estimating the LAI based on the existing indirect methodologies requires human presence for the collection of data, and may result in estimation errors of up to 25% because of occlusions and cluttering introduced by the dense canopies.

Through remote sensing, promising indirect approaches for the measurements of the spatial variability in LAI have been proposed, with their application in real world scenarios being infrequent and spatially limited. Via the use of detailed 3D models of individual crops, a methodology is proposed herein to alleviate these drawbacks and provide LAI measurements that can be used for daily updates of crop growth models, and enhance the ability to estimate crop nutrient requirements.

A popular interpretation of the LAI when dealing with canopy imaging considers the ratio of the total area of the green leaves to the area of the green leaves when they are projected on the ground:

$$LAI = A_{GL}/A_{PGL}, \quad (5.1)$$

with $A_{GL}$ denoting the Area of the Green Leaves and $A_{PGL}$ the Area of the Projected Green Leaves. This interpretation of the LAI index receives values $\geq 1$ since $A_{PGL}$ is generally smaller than $A_{GL}$ considering the various occlusions amongst leaves.

In order to estimate the LAI based on its original definition as provided by Eq. 5.1, the two quantities that correspond to i) the one-sided green leaf area ($A_{GL}$) and ii) the unit ground surface area ($A_{PGL}$) need to be computed.

Even with the refinement step of SKF 4.4, significant problems manifest with the creation of a 3D point cloud due to noisy measurements and textureless leaf areas. In particular, noise corrupted points that were originally part of the actual leaf surface are reconstructed away from it and are hard to detect and correct. Furthermore, lack of texture generates large uneven holes in the central parts of the leaves that require supervised hole filling algorithms in order to create a meaningful surface for the area computation.

A computationally efficient algorithm that produces satisfactory results overcoming the aforementioned limitations is the Self-Organized Map (SOM). Utilizing two fully connected layers of a neural network, SOM is an unsupervised algorithm which creates a grid that organizes itself to capture the topology of the provided data. The SOM is undertaking an automatic smoothing of data by fitting this grid of points according to the density of the recorded data, thus minimizing fitting error in densely reconstructed areas. The grid, also known as lattice, provides flexibility in that its granularity is controlled at will by the user. Altering this parameter can achieve higher execution speed so that the estimation of the LAI is performed without affecting the accuracy to undesirable levels.

In the present case, the provided data is a point cloud of a leaf and the SOM is used to express the surface of the leaf so that the area computation is feasible. When the SOM converges to its final form (FIG. 22C), several four-edged polygons with known vertices cover the surface of the leaf and are identified as $r_{u,v}$, with $u=1, \ldots, K$ number of polygons and $v=1, 2, 3,$ or 4 the number of the vertex in a clockwise order (FIG. 21A). Each polygon is then broken down into two triangles by indexing its four vertices v in order $1 \to 2 \to 3$ (triangle a) and $3 \to 4 \to 1$ (triangle b). The total area of the surface can be approximated by adding the areas of all the triangles. Finally, the total green leaves area ($A_{GL}$) is the summation of the areas of the individual leaf clusters.

$A_{PGL}$ can be computed in a simpler manner. First, all the vertices of the SOM lattice are treated as 3D points and are projected on the ground with the projection matrix:

$$T = I_3 - nn^T \in \mathbb{R}^{3\times 3}, \quad (5.2)$$

with $I_3 \in \mathbb{R}^{3\times 3}$ the identity matrix and $n \in \mathbb{R}^{3\times 3}$ the normal vector of the ground plane. The projected points form a concave two dimensional polygon in 3D which is used to create a mesh of triangles that occupy the desired area. An occupancy grid with known cell size is generated and overlayed on top of the mesh to determine how many cells are occupied. Again, adding the area of all the occupied cells provides an estimation of $A_{PGL}$.

Figure 21B:
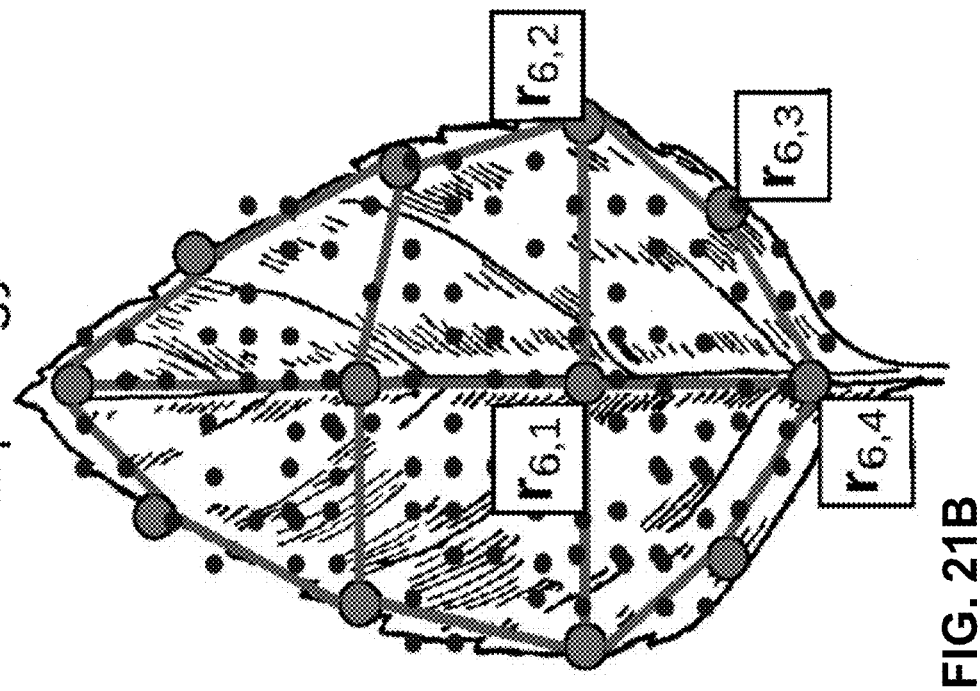
FIGS. 21A and 21B show a Self-Organized-Map (SOM) lattice (FIG. 21A) adapting to the surface of the reconstructed leaf (FIG. 21B) capturing the topology of the reconstructed points.
Figure 21A:
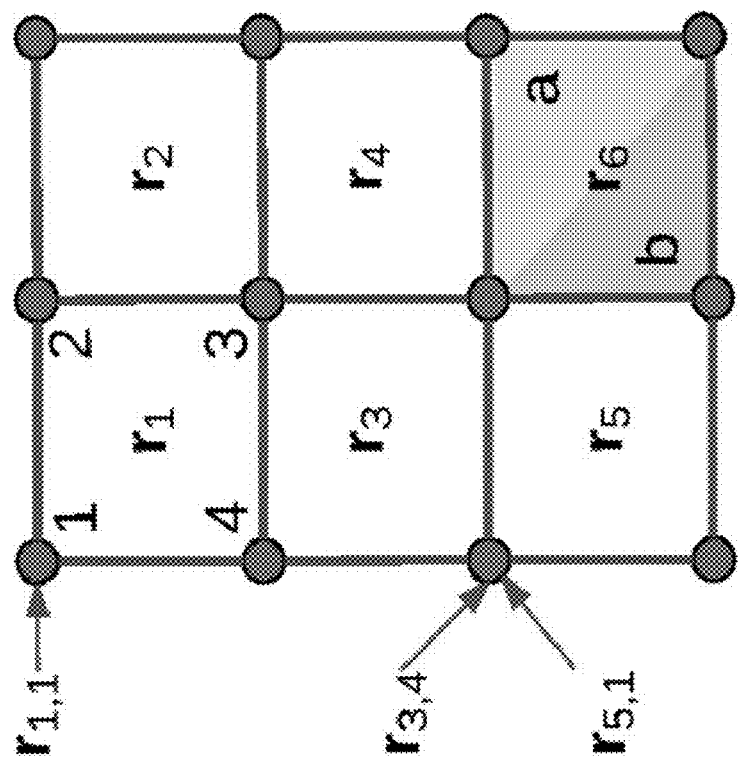

FIGS. 21A and 21B are images showing the Self-Organized-Map (SOM) lattice (FIG. 21A) adapting to the surface of the leaf (FIG. 21B) capturing the topology of the reconstructed points. In FIG. 21A, each square in the lattice receives an identification label ru and its four vertices (larger dots) are numbered in a clockwise fashion starting from the top left v=1, 2, 3, or 4. This way, the computation of the area through the two triangles (a and b) is feasible. In FIG. 21B, the lattice assumes the reconstructed points' (small dots) topology. On a 3D surface, the SOM lattice resembles a membrane that stretches around the 3D points. An example of the sixth polygon's indices is visible inside the squares.

5.1.1 Experimental Results Results on the algorithm that estimates the area of the leaves is present in FIGS. 22A-22C. FIGS. 22A-22C illustrate the progression of the Self-Organized Map. The initial lattice (grid) is iteratively trying to capture the topology of the leaf (dots represent the 3D points of the leaf). The outliers are ignored, and the resulting surface is resembling the real leaf despite the reconstruction errors. Top row is a top-down view of the leaf, bottom row is a lateral view. "t" in FIGS. 22A-22C symbolizes the time step in the algorithmic process. In MatLab the average processing time of one leaf is 0.52 seconds.

FIGS. 22A-22C shows the expansion of the network over several iterations until it converges. Two viewpoints are provided to clarify the progress steps. The SOM algorithm has proven to be particularly robust and manages to adapt to the data providing a leaf-like shape and overcoming limitations such as noise (FIG. 25A), small number of points (FIG. 25B), and sparse reconstruction (FIG. 25C).

FIGS. 25A-25C are images showing extreme cases of reconstructed leaves validate that the algorithm performs satisfactorily. In FIG. 25A, a small number of images was used for the reconstruction, resulting in a noisy point cloud. The reconstructed leaf in FIG. 25B is small and further away from the camera, therefore its 3D points are fewer and sparse. A significant part of the leaf has not been reconstructed in FIG. 25C.

The validity of the algorithm is assessed by comparing the computed $A_{GL}$ scaled using Eq. 4.2, against the groundtruthed total leaf area ($A_{GL}$) measurements of the artificial dataset. In Table 5.1, each column represents one of the six experiments and the rows hold the estimated leaf area information for each plant. The total leaf area is the sum of the individual plants' leaf area and the accuracy of the methodology is validated by the relative error which is computed as:

$$\text{error} = \frac{\text{abs}(T - GT)}{GT}. \quad (5.3)$$

The estimated LAI is presented last for completeness despite the lack of means to compute the groundtruthed projected leaf area ($A_{PGL}$).

TABLE 5.1

Leaf area estimation for each one of the plants in all six experimental setups. The mean ground truth total leaf area for a single artificial plant is $A_{GL}$ = 0.1119. Since all six artificial plants are industrially manufactured, we assume they share approximately the same total leaf area. The variable T represents the estimated total leaf area, which is a column-wise sum of each experiment and GT is the groundtruth total area of the reconstructed plants. The LAI is computed for each experiment and presented in the last row.

| | | No. of Experiment | | | | | |
|---|---|---|---|---|---|---|---|
| | | 1 | 2 | 3 | 4 | 5 | 6 |
| Corn | a | 0.1198 | 0.1062 | 0.1205 | 0.1392 | 0.1328 | 0.1216 |
| Stalk | b | — | 0.1241 | 0.1137 | 0.1361 | 0.1294 | 0.1090 |
| ID | c | — | — | 0.1251 | 0.1103 | 0.1405 | 0.1377 |
| | d | — | — | — | 0.0989 | 0.1002 | 0.1150 |

TABLE 5.1-continued

Leaf area estimation for each one of the plants in all six experimental setups. The mean ground truth total leaf area for a single artificial plant is $A_{GL}$ = 0.1119. Since all six artificial plants are industrially manufactured, we assume they share approximately the same total leaf area. The variable T represents the estimated total leaf area, which is a column-wise sum of each experiment and GT is the groundtruth total area of the reconstructed plants. The LAI is computed for each experiment and presented in the last row.

| | No. of Experiment | | | | | |
|---|---|---|---|---|---|---|
| | 1 | 2 | 3 | 4 | 5 | 6 |
| e | — | — | — | — | 0.0975 | 0.1281 |
| f | — | — | — | — | — | 0.1000 |
| T | 0.1198 | 0.2303 | 0.3593 | 0.4845 | 0.6004 | 0.7114 |
| GT | 0.1119 | 0.2238 | 0.3357 | 0.4476 | 0.5595 | 0.6714 |
| error | 6.59% | 2.82% | 6.57% | 7.62% | 6.81% | 5.62% |
| LAI | 1.6954 | 1.6667 | 2.6882 | 2.6994 | 1.8296 | 2.7205 |

Figure 23:
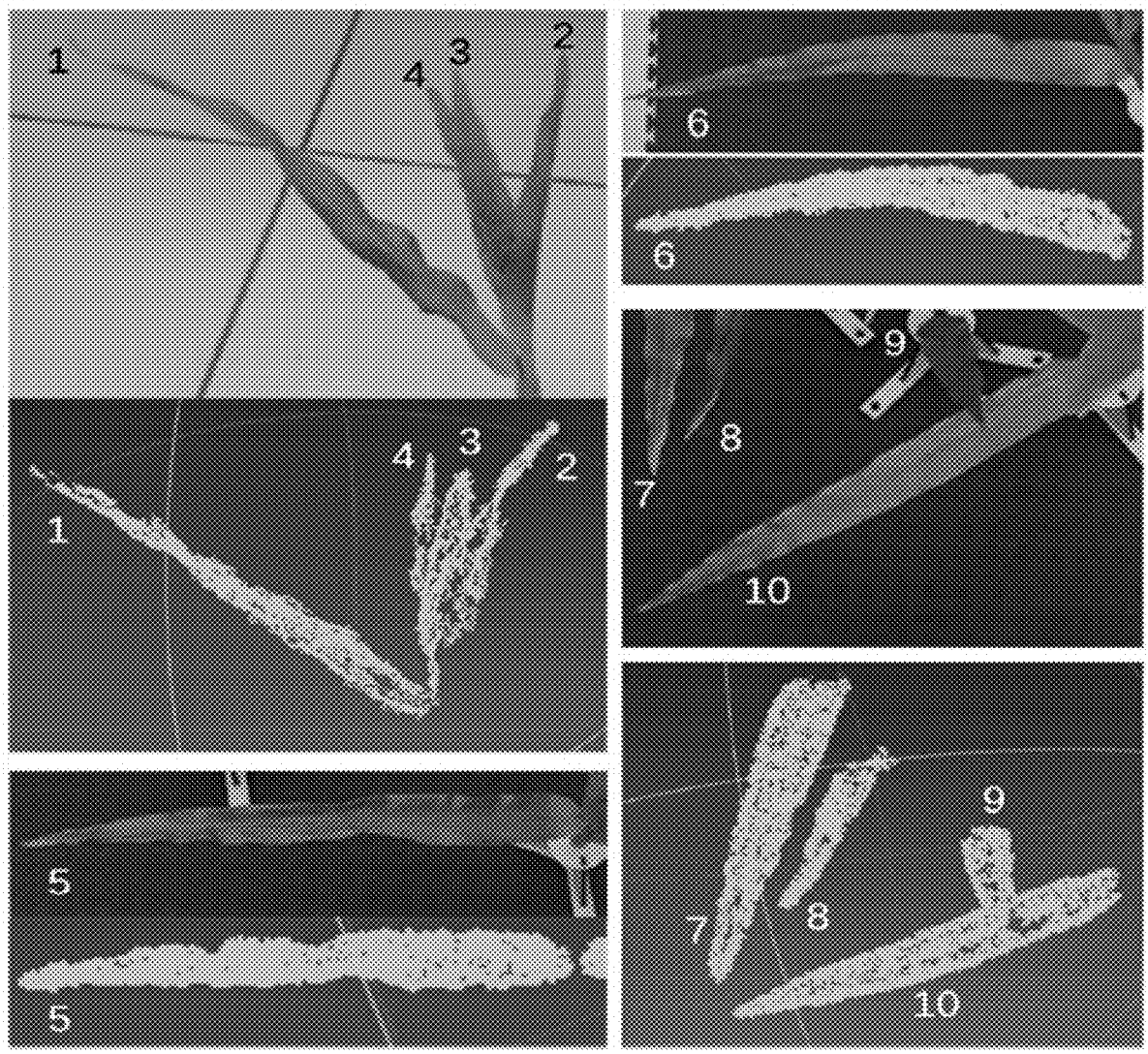
FIG. 23 shows several examples of initial images along with their reconstructed pairs.

Further, in FIG. 23 some examples of single leaf area estimation taken from the most complex experiment #6 are presented. An image of the leaf is placed next to its 3D reconstruction followed by the estimated and groundtruthed values of its area presented in Table 5.2. These results support our proposed methodology and suggest that we may aim for a generalizable version that can be utilized as a tool for the estimation of LAI and the replacement of outdated and labor intensive solutions.

TABLE 5.2

This table accumulates the area estimation and groundtruth (GT) of the leaf instances seen in FIG. 23. An interesting observation regarding the leaves #3 and #4 can be made regarding the accuracy of the area estimation. These leaves are too close for the 3D skeletonization algorithm to separate them correctly resulting to one of the two leaves dominating over the other. The summation of their respective estimated areas closely follows the groundtruth.

| | Leaf # | | | | |
|---|---|---|---|---|---|
| | 1 | 2 | 3 | 4 | 5 |
| Area | 0.0204 | 0.0062 | 0.0122 | 0.0031 | 0.0320 |
| GT | 0.0168 | 0.0055 | 0.0051 | 0.0086 | 0.0261 |

| | Leaf # | | | | |
|---|---|---|---|---|---|
| | 6 | 7 | 8 | 9 | 10 |
| Area | 0.0228 | 0.0210 | 0.0190 | 0.0189 | 0.0295 |
| GT | 0.0247 | 0.0247 | 0.0165 | 0.0165 | 0.0261 |

5.2 Biometrics—Individual Plant Height

Figure 26:
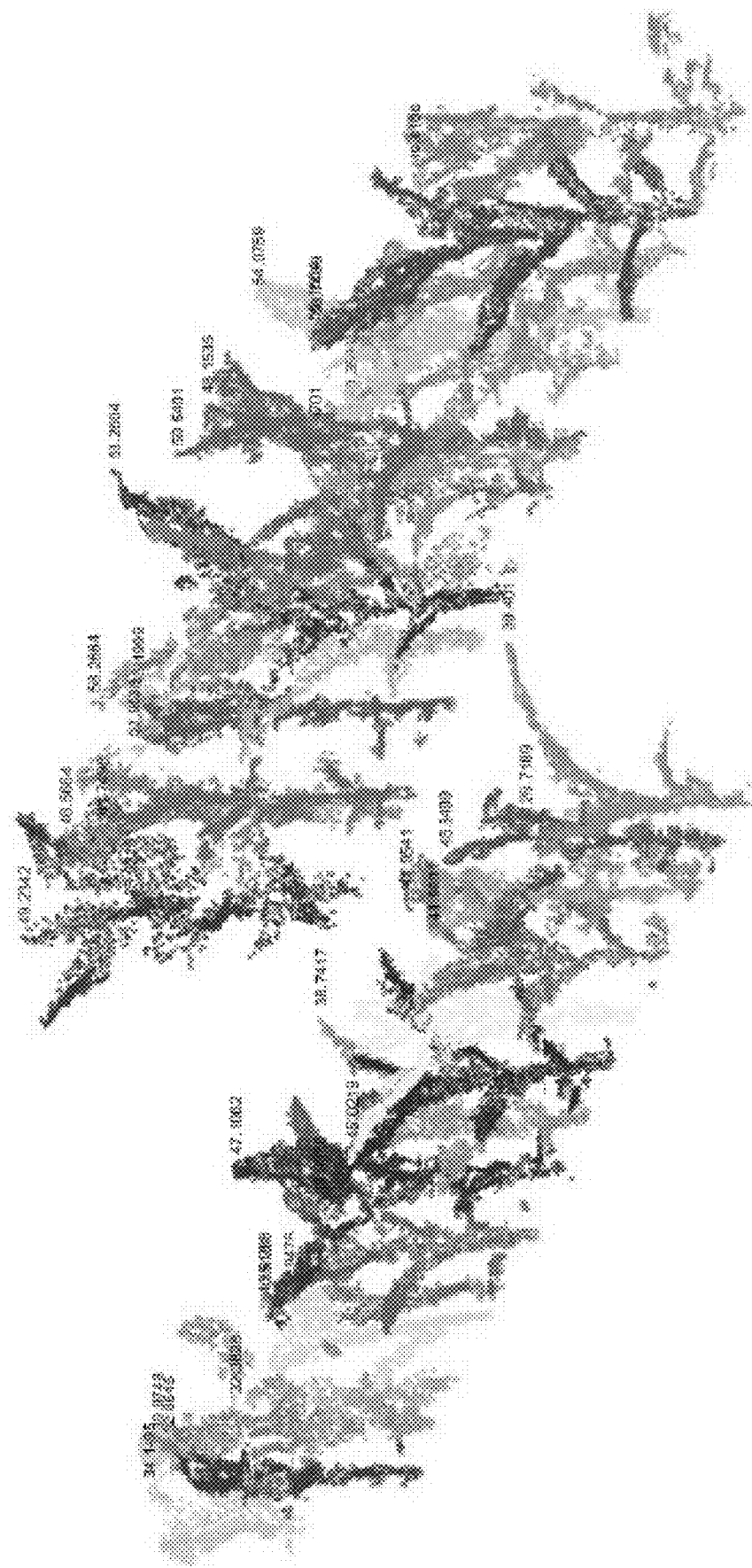
FIG. 26 illustrates the results of the automated height computation for individual plants shown next to the highest point of each plant.

The height of a corn plant was defined as the Euclidean distance from the highest point of the newly emerging leaves to the lowest point that touches the ground. This definition was chosen to avoid inaccuracies arising from plants with stems not perpendicular to the ground and the unpredictable changes of the ground elevation. The distance of the highest plant point to its projection on the ground may be prone to error if the plant is not completely perpendicular to the ground. From a visual inspection of FIG. 26 it is apparent that the newly emerging leaves are growing above the plant acting as an extension of the stem. Since the positioning of those new leaves depend on the crop hybrid, it is helpful to include them in the plant height estimation to provide a better decision tool for the hybrid developers.

A variance of the stem segmentation algorithm 4.3.2 is utilized for the estimation of individual plant height. The differences are focused on two parameters; fewer iterations of the overall algorithm, and a larger standard deviation for the constrained local RAIN step. This allows the plants to keep their top leaves during the pruning steps as these are located closely above the cluster centers. The resulting clusters of plant points consist of the stem and the top leaves and the highest point of each plant cluster is obtained by a search for the maximum z coordinate.

The lowest point of a stem cluster is not always touching the ground, and this is a result of a poor reconstruction. The decision on the actual lowest point is made based on a voting scheme of neighboring stems. The plants that belong to the same row vote to decide on an average lowest point and the plants that are close enough to that average are allowed to use their own lowest point, whereas the plants that are far away from it are forced to use the average. The row detection described in Sec. 4.3.2 is utilized for the selection of the lowest points of the plants and the height is just a subtraction between the z values of the highest and lowest points.

5.2.1 Experimental Results

Figure 27:
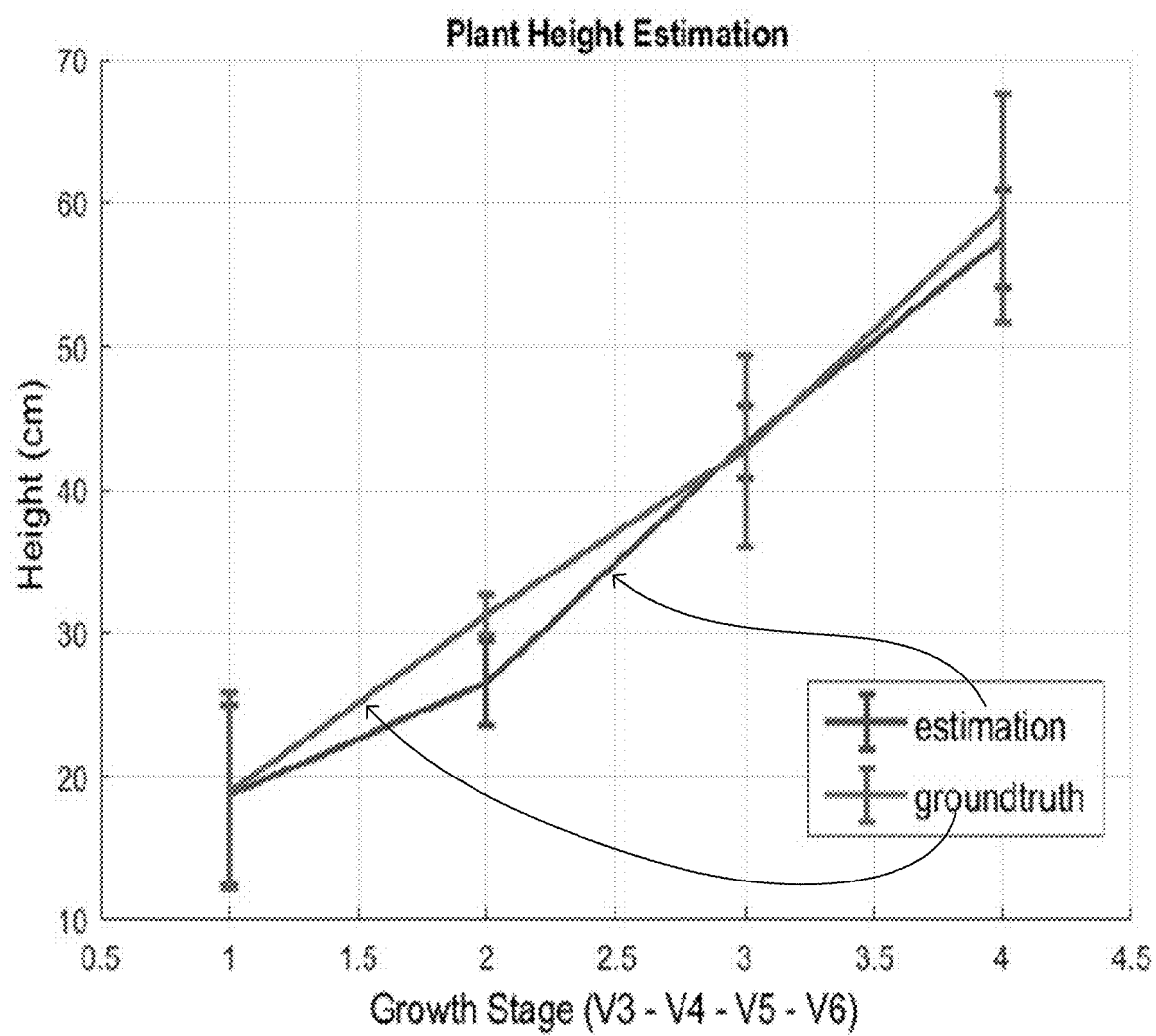
FIG. 27 illustrates the estimated and groundtruthed average height values of two rows with about 15 plants each. The "V4" reconstruction generated a few plants with parts of their top half missing and this resulted to an underestimation of the mean height.

In FIG. 27, a numerical comparison between the estimation and the groundtruth of the mean and standard deviation of plant heights in different growth stages shows that the proposed methodology captures the reality of the plants growing as their growth stages advance. At the same time, FIG. 27 shows the plant segmentation and height estimation of real corn plants at "V5".

Some of the plants, especially the ones at the border of the two rows, show missing parts (leaves and stem) that create erroneous height estimations. The voting scheme that decides on a lowest point representative manages to reduce the amount of error but when top leaves are lost during the plant segmentation, very little information can be retrieved. Nevertheless, as seen in FIG. 27, a qualitative impression of the individual height can be drawn from the inspection of the plants and sometimes this can be enough for a farmer.

5.3 Biometrics—at the Intersection of Stems and Leaves

Under this category fall a few biometrics whose estimation depends on the same algorithms since they rely on the 3D points where a leaf and the stem meet. Three such biometrics were selected based on their significance for the researchers of corn plants and they are:

1. the leaf count,
2. the leaf angle with respect to the stem, and
3. the inter-nodal distance.

The first component of this estimation is again based on a pipeline of the RAIN algorithm 4.3.2 where a few iterations segment the plants followed by several more iterations for the stem detection. Each plant is processed separately and, starting from the stem points, a region growing iterative process is looking for leaves. The region between the stem and each leaf is a node of the plant and this information can be used to extract all the aforementioned biometrics.

The algorithm for the detection of the nodes initially reduces the number of points using a k-means clustering with a large number of clusters for both the stem cloud and the whole segmented plant. This produces regularly spaced and eroded versions of the initial point clouds and allows for a more clean and efficient solution. The lowest point of the resulting point cloud is set as the root of the plant and a constrained RANSAC is used to determine the best 3D line fit using the following parametric line model:

$$l = p + ut, \quad (5.4)$$

where l is the line, p is a point on the line, u is the direction of the line, and $t \in \mathbb{R}$ is a scalar parameter. The way the constraint RANSAC works is that it requires that the root point is always in the selected random set point.

Once this small number of points on the 3D line have been defined and constrained on the stem, they act as scouts for the detection of leaves. For each one of these points, an increasingly larger radius is searching for neighbors and once a neighbor is found a region growing algorithm expands and captures all the non-stem points of the potential leaf. All the points that belong to the same expanded region are then marked and cannot be visited as potential candidates for other stem points.

This method is used to count the number of leaves and pinpoint the base of each leaf and use it to extract the nodes. In turn, the nodes are the points where the angles between leaves and the stem can be extracted. A simple computation of the covariance matrix of the candidate leaf at the points close to the stem reveals the direction of the leaf, similarly to the way the ground plane normal was computed in 4.2. The eigenvector that corresponds to the largest eigenvalue is the direction of the leaf, and the angle can be computed from the inner product of this eigenvector with the direction of the stem as computed in 5.4.

5.3.1 Experimental Results

Figure 28:
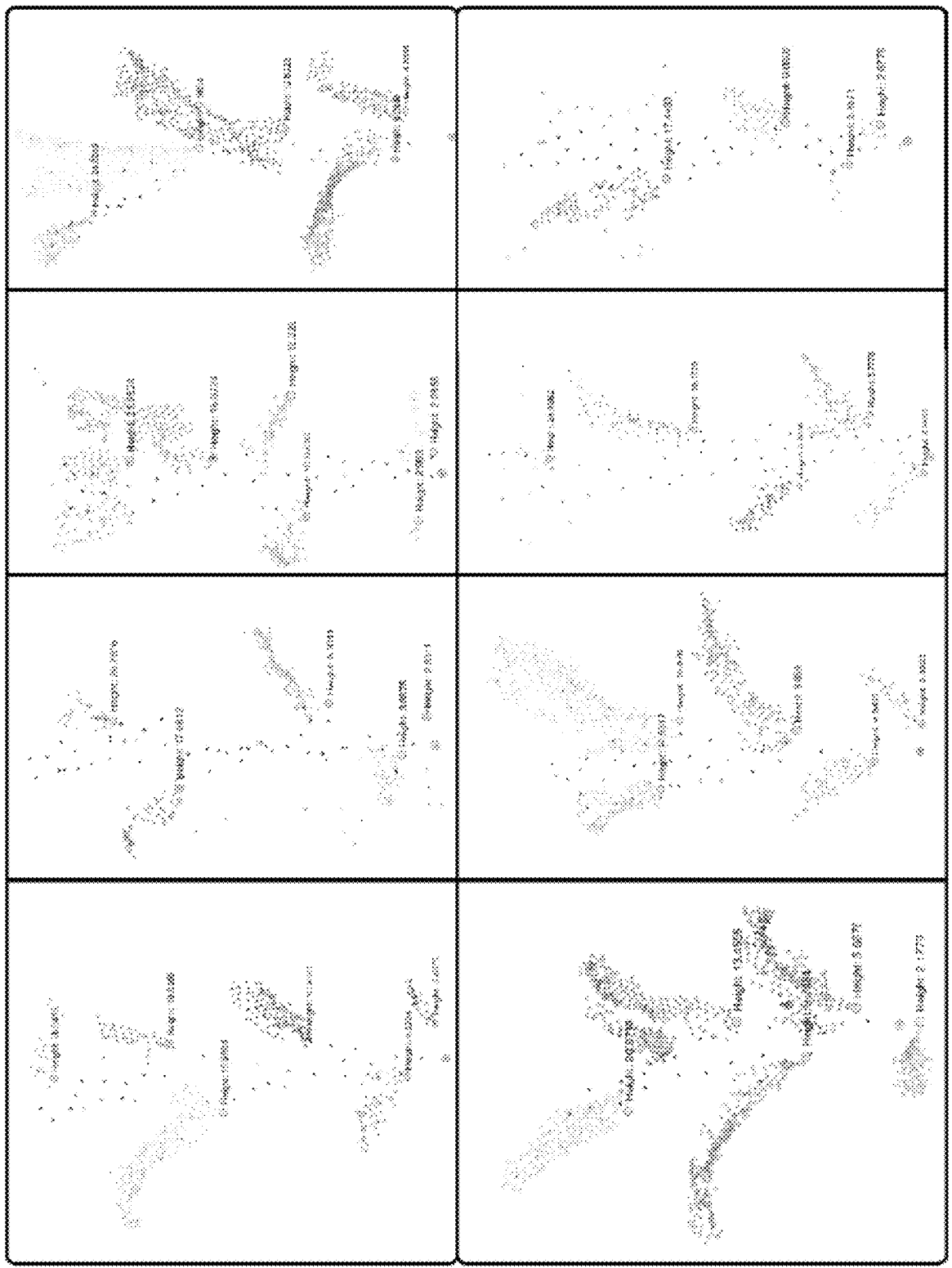
FIG. 28 shows examples of individual plants with their leaves segmented and the height of their nodes denoted. The plants are between "V3" and "V5".
Figure 29:
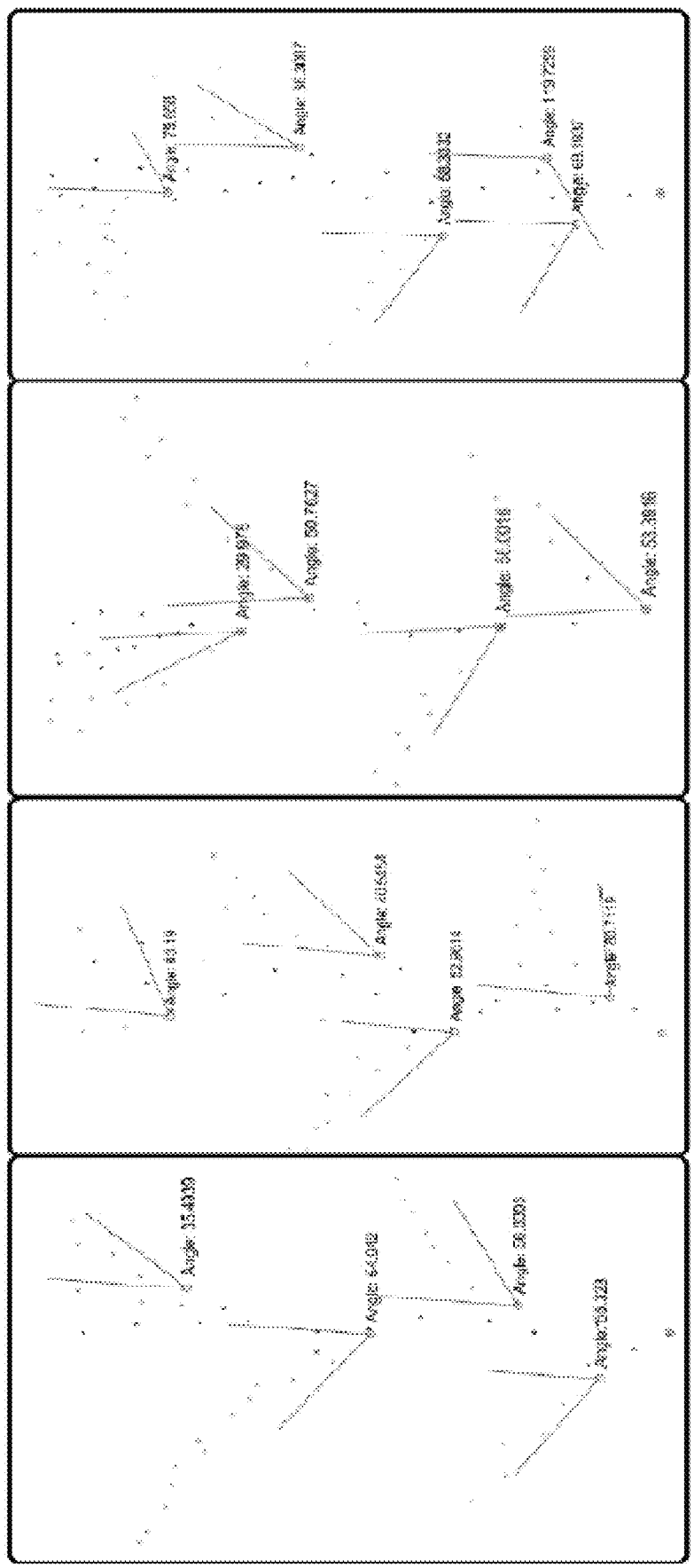
FIG. 29 shows examples of individual plants with automated annotations of the angle between the stem and the leaves. The plants are between "V3" and "V5".

The results of some real corn plants can be seen in FIG. 28 where the height of each node is depicted at the point that is considered the base of each leaf. FIG. 28 shows examples of individual plants with their leaves segmented and the height of their nodes denoted. The plants are between "V3" and "V5". The different heights can be used to compute the inter-nodal distance, and the nodes of the leaves reveal the leaf-to-stem angle as seen in the visualization of FIG. 29. FIG. 29 shows examples of individual plants with automated annotations of the angle between the stem and the leaves. The plants are between "V3" and "V5".

Same as the previous biometrics, the quality of the 3D reconstruction plays a significant role in the accuracy of the computations. The largest problem comes from the noisy points floating between leaves as they may connect two leaves together during a region growing process. This may result in a wrong number of leaves, inter-nodal distances, and stem-leaf angle estimation.

Various examples have been described. These and other examples are within the scope of the following example clauses and claims.

Clause 1. A system for detecting crop biometrics, the system comprising an unmanned vehicle comprising at least one imaging device; and a crop modeling device communicatively coupled to the imaging device, wherein the crop modeling device comprises a processor configured to receive, from the imaging device, a plurality of images of a crop of plants in a field, generate, based on the plurality of images, a three-dimensional (3D) model of the plants, wherein the 3D model defines locations and orientations of leaves and stems of respective plants, segment the 3D model to locate a respective stem and a respective uppermost leaf of each respective plant, and determine, based on the separation between the base of the respective stem and the respective uppermost leaves, a respective plant height of the respective plant.

Clause 2. The system of clause 1, wherein the processor is configured to determine the separation between the base of the respective stem and the respective uppermost leaf by determining an average lowest point for a predetermined plurality of plants adjacent to and comprising the respective plant.

Clause 3. A technique for detecting crop biometrics, the technique comprising receiving, by a processor, from an imaging device of an unmanned vehicle, a plurality of images of a crop of plants in a field; generating, by the processor, based on the plurality of images, a three-dimensional (3D) model of the plants, wherein the 3D model defines locations and orientations of leaves and stems of respective plants, segmenting, by the processor, the 3D model to locate a respective stem and a respective uppermost leaf of each respective plant, and determining, by the processor, based on the separation between the base of the respective stem and the respective uppermost leaves, a respective plant height of each respective plant.

Clause 4. The system of clause 3, wherein the determining the separation between the base of the respective stem and the respective uppermost leaf comprises determining an average lowest point for a predetermined plurality of plants adjacent to and comprising the respective plant.

Clause 5. A crop modeling device comprising a processor and a non-transitory computer readable storage medium comprising instructions, that when executed, cause the processor to: receive, from an imaging device of an unmanned vehicle, a plurality of images of a crop of plants in a field, generate, based on the plurality of images, a three-dimensional (3D) model of the plants, wherein the 3D model defines locations and orientations of leaves and stems of respective plants, segment the 3D model to locate a respective stem and a respective uppermost leaf of each respective plant, and determine, based on the separation between the base of the respective stem and the respective uppermost leaves, a respective plant height of each respective plant.

Clause 6. The crop modeling device of clause 5, wherein the non-transitory computer readable storage medium further comprises instructions, that when executed, cause the processor to determine the separation between the base of the respective stem and the respective uppermost leaf by determining an average lowest point for a predetermined plurality of plants adjacent to and comprising the respective plant.

Clause 7. A system for detecting crop biometrics, the system comprising an unmanned vehicle comprising at least one imaging device; and a crop modeling device communicatively coupled to the imaging device, wherein the crop modeling device comprises a processor configured to: receive, from the imaging device, a plurality of images of a crop of plants in a field, generate, based on the plurality of images, a three-dimensional (3D) model of the plants, wherein the 3D model defines locations and orientations of leaves and stems of respective plants, segment the 3D model to locate a respective stem and a respective plurality of leaves of each respective plant, determine, based on the segmentation, a plurality of leaf-stem nodes of each respective plant, and determine, based on the leaf-stem nodes, at least one of a leaf count, a leaf angle, or an inter-nodal distance of each respective plant.

Clause 8. The system of clause 7, wherein the processor is further configured to generate a point cloud reconstruction based on the plurality of images, generate a reduced point cloud reconstruction by reduce the number of points in the point cloud reconstruction by k-means clustering, and generate the 3D model based on the reduced point cloud reconstruction.

Clause 9. A technique for detecting crop biometrics, the technique comprising receiving, by a processor, from an imaging device of an unmanned vehicle, a plurality of images of a crop of plants in a field; generating, by the processor, based on the plurality of images, a three-dimensional (3D) model of the plants, wherein the 3D model defines locations and orientations of leaves and stems of respective plants, segmenting, by the processor, the 3D model to locate a respective stem and a respective plurality of leaves of each respective plant, determining, by the processor, based on the segmentation, a plurality of leaf-stem nodes of each respective plant, and determining, by the processor, based on the leaf-stem nodes, at least one of a leaf count, a leaf angle, or an inter-nodal distance of each respective plant.

Clause 10. The technique of clause 9, further comprising generating, by the processor, a point cloud reconstruction based on the plurality of images; generating, by the processor, a reduced point cloud reconstruction by reduce the number of points in the point cloud reconstruction by k-means clustering; and generating, by the processor, the 3D model based on the reduced point cloud reconstruction.

Clause 11. A crop modeling device comprising a processor and a non-transitory computer readable storage medium comprising instructions, that when executed, cause the processor to receive, from an imaging device of an unmanned vehicle, a plurality of images of a crop of plants in a field, generate, based on the plurality of images, a three-dimensional (3D) model of the plants, wherein the 3D model defines locations and orientations of leaves and stems of respective plants, segment the 3D model to locate a respective stem and a respective plurality of leaves of each respective plant, determine, based on the segmentation, a plurality of leaf-stem nodes of each respective plant, and determine, based on the leaf-stem nodes, at least one of a leaf count, a leaf angle, or an inter-nodal distance of each respective plant.

Clause 12. The crop modeling device of clause 5, wherein the non-transitory computer readable storage medium further comprises instructions, that when executed, cause the processor to generate a point cloud reconstruction based on the plurality of images, generate a reduced point cloud reconstruction by reduce the number of points in the point cloud reconstruction by k-means clustering, and generate the 3D model based on the reduced point cloud reconstruction.

Clause 13. A system for detecting crop biometrics, the system comprising: an unmanned vehicle comprising at least one imaging device; and a crop modeling device communicatively coupled to the imaging device, wherein the crop modeling device comprises a processor configured to receive, from the imaging device, a plurality of images of a leaf of a plant in a field, generate, based on the plurality of images, a point cloud model of the leaf, generate, based on the point cloud model, a self-organized map representing a surface of the leaf, and determine, based on the self-organized map, a total surface area of the leaf.

Clause 14. The system of clause 13, wherein the plurality of images includes images taken at different locations and different orientations about the leaf.

Clause 15. The system of clauses 13 or 14, wherein the self-organized map is defined by four-sided polygons.

Clause 16. A technique for detecting crop biometrics, the technique comprising receiving, by a processor, from an imaging device of an unmanned vehicle, a plurality of images of a leaf of a plant in a field; generating, by the processor, based on the plurality of images, a point cloud model of the leaf; generating, by the processor, based on the point cloud model, a self-organized map representing a surface of the leaf; and determining, by the processor, based on the self-organized map, a total surface area of the leaf.

Clause 17. The technique of clause 16, wherein the plurality of images includes images taken at different locations and different orientations about the leaf Clause 18. The technique of clause 4 or 5, wherein the self-organized map is defined by four-sided polygons.

Clause 19. A crop modeling device comprising a processor and a non-transitory computer readable storage medium comprising instructions, that when executed, cause the processor to receive, from an imaging device of an unmanned vehicle, a plurality of images of a leaf of a plant in a field, generate, based on the plurality of images, a point cloud model of the leaf, generate, based on the point cloud model, a self-organized map representing a surface of the leaf, and determine, based on the self-organized map, a total surface area of the leaf.

Clause 20. The crop modeling device of clause 19, wherein the plurality of images includes images taken at different locations and different orientations about the leaf.

Clause 21. The crop modeling device of clause 19 or clause 20, wherein the self-organized map is defined by four-sided polygons.

What is claimed is:

1. A system for detecting crop biometrics, the system comprising:
a crop modeling device communicatively coupled to an imaging device, wherein the crop modeling device comprises processing circuitry configured to:
receive, from the imaging device, a plurality of images of a crop of a plurality of plants in a field, wherein the plurality of plants in the field include at least one of overlapping or occluding leaves,
generate, based on the plurality of images, a three-dimensional (3D) model of the plurality of plants, wherein the 3D model defines locations and orientations of leaves and stems of respective plants of the plurality of plants, and
determine, based on the 3D model, at least one of a plant height, a leaf count, a leaf angle, or an inter-nodal distance of a respective plant of the plurality of plants in the field, the respective plant including the at least one of the overlapping or the occluding leaves,
wherein the processor is configured to generate the 3D model of the plurality of plants by at least:
generating an initial point cloud reconstruction of the plurality of plants in the field based on the plurality of images,
simulating respective routes of a plurality of randomly selected points of the initial point cloud by:
identifying a ground plane within a 3D space of the initial point cloud reconstruction,
simulating, for each of a plurality of randomly selected points within the initial point cloud, point-by-point movement from an initial position of the selected point within the initial point cloud reconstruction towards the identified ground plane based on a height of respective points within the initial point cloud, and
determining the respective routes of the plurality of randomly selected points based on the simulated point by point movement,
detecting respective stems of the plurality of plants based on the simulated respective routes, and
following the detection of the respective stems of the plurality of plants, separating the at least one of overlapping or occluding leaves of the plurality of plants in the field by segmenting the leaves connected to the respective stems using the initial point cloud reconstruction.

2. The system of claim 1, further comprising an unmanned aerial vehicle including the at least one imaging device.

3. The system of claim 1, wherein the processor is configured to determine the at least one of the plant height, the leaf count, the leaf angle, or the inter-nodal distance of the respective plant including the at least one of the overlapping or the occluding leaves by at least:
locating, following the separation of the at least one of overlapping or occluding leaves, a respective stem and a respective uppermost leaf of each respective plant,
determining a separation between the base of the respective stem and the respective uppermost leaf, and
determining, based on the separation between the base of the respective stem and the respective uppermost leaf, the plant height of the respective plant.

4. The system of claim 3, wherein the processor is configured to determine the separation between the base of the respective stem and the respective uppermost leaf by at least determining an average lowest point for a predetermined plurality of plants adjacent to and comprising the respective plant.

5. The system of claim 1, wherein the processor is configured to determine the at least one of the plant height, the leaf count, the leaf angle, or the inter-nodal distance of the respective plant including the at least one of the overlapping or the occluding leaves by at least:
locating, following the separation of the at least one of overlapping or occluding leaves, a respective stem and a respective uppermost leaf of each respective plant,
determining, based on the segmentation, a plurality of leaf-stem nodes of each respective plant, and
determining, based on the leaf-stem nodes, at least one of the leaf count, the leaf angle, or the inter-nodal distance of each respective plant.

6. The system of claim 5, wherein the processor generates the initial point cloud reconstruction of the plurality of plants in the field based on the plurality of images by at least:
generating a reduced point cloud reconstruction by reduce the number of points in the initial point cloud reconstruction by k-means clustering.

7. The system of claim 1, wherein the processor is configured to:
receive, from the imaging device, a plurality of images of a leaf of a plant in a field,
generate, based on the plurality of images, a point cloud model of the leaf,
generate, based on the point cloud model, a self-organized map representing a surface of the leaf, and
determine, based on the self-organized map, a total surface area of the leaf.

8. The system of claim 7, wherein the plurality of images includes images taken at different locations and different orientations about the leaf.

9. The system of claim 7, wherein the self-organized map is defined by four-sided polygons.

10. A method for detecting crop biometrics, the method comprising:
receiving, by processing circuitry and from an imaging device, a plurality of images of a crop of a plurality of plants in a field, wherein the plurality of plants in the field include at least one of overlapping or occluding leaves;
generating, by the processing circuitry, based on the plurality of images, a three-dimensional (3D) model of the plurality of plants, wherein the 3D model defines locations and orientations of leaves and stems of respective plants of the plurality of plants; and
determining, by the processing circuitry and based on the 3D model, at least one of a plant height, a leaf count, a leaf angle, or an inter-nodal distance of a respective plant of the plurality of plants in the field, the respective plant including the at least one of the overlapping or the occluding leaves, wherein generating the 3D model of the plurality plants comprises:

generating an initial point cloud reconstruction of the plurality of plants in the field based on the plurality of images, simulating respective routes of a plurality of randomly selected points of the initial point cloud by:

identifying a ground plane within a 3D space of the initial point cloud reconstruction, simulating, for each of a plurality of randomly selected points within the initial point cloud, point-by-point movement from an initial position of the selected point within the initial point cloud reconstruction towards the identified ground plane based on a height of respective points within the initial point cloud, and determining the respective routes of the plurality of randomly selected points based on the simulated point by point movement, detecting respective stems of the plurality of plants based on the simulated respective routes, and following the detection of the respective stems of the plurality of plants, separating the at least one of overlapping or occluding leaves of the plurality of plants in the field by segmenting the leaves connected to the respective stems using the initial point cloud reconstruction.

11. The method of claim 10, wherein the imaging device is part of an unmanned vehicle, and wherein the unmanned vehicle comprises an unmanned aerial vehicle.

12. The method of claim 10, wherein determining, based on the 3D model, the at least one of the plant height, the leaf count, the leaf angle, or the inter-nodal distance of the respective plant including the at least one of the overlapping or the occluding leaves comprises:

locating, following the separation of the at least one of overlapping or occluding leaves, by the processor, a respective stem and a respective uppermost leaf of each respective plant, determining a separation between the base of the respective stem and the respective uppermost leaf, and determining, based on the separation between the base of the respective stem and the respective uppermost leaf, the plant height of the respective plant.

13. The method of claim 12, wherein determining the separation between the base of the respective stem and the respective uppermost leaf comprises determining an average lowest point for a predetermined plurality of plants adjacent to and comprising the respective plant.

14. The method of claim 10, wherein determining, based on the 3D model, the at least one biometric parameter of the crop of plants in the field comprises:

locating, following the separation of the at least one of overlapping or occluding leaves, a respective stem and a respective plurality of leaves of each respective plant, determining, based on the segmentation, a plurality of leaf-stem nodes of each respective plant, and determining, based on the leaf-stem nodes, at least one of the leaf count, the leaf angle, or the inter-nodal distance of each respective plant.

15. The system of claim 14, wherein generating the initial point cloud reconstruction of the plurality of plants in the field based on the plurality of images comprises generating a reduced point cloud reconstruction by reduce the number of points in the initial point cloud reconstruction by k-means clustering.

16. The method of claim 1, further comprising:

receiving, from the imaging device, a plurality of images of a leaf of a plant in a field, generating, based on the plurality of images, a point cloud model of the leaf, generating, based on the point cloud model, a self-organized map representing a surface of the leaf, and determining, based on the self-organized map, a total surface area of the leaf.

17. The method of claim 16, wherein the plurality of images includes images taken at different locations and different orientations about the leaf.

18. The method of claim 16, wherein the self-organized map is defined by four-sided polygons.

19. The system of claim 1, wherein the processing circuitry is configured to detect the respective stems based on common simulated routes of the randomly selected points.

20. The system of claim 1, wherein the processing circuitry is configured to apply a skeleton Kalman filtering process to separate the at least one of the overlapping or the occluding leaves of the plurality of plants.

* * * * *